(12) United States Patent
Wang

(10) Patent No.: US 12,719,337 B2
(45) Date of Patent: Aug. 25, 2026

(54) POWER SUPPLY SYSTEM FOR ELECTRIC VEHICLES

(71) Applicant: Yongxin Wang, San Ramon, CA (US)

(72) Inventor: Yongxin Wang, San Ramon, CA (US)

( * ) Notice: Subject to any disclaimer, the term of this patent is extended or adjusted under 35 U.S.C. 154(b) by 382 days.

(21) Appl. No.: 18/290,651

(22) PCT Filed: Jul. 12, 2022

(86) PCT No.: PCT/US2022/036800

§ 371 (c)(1),
(2) Date: Jan. 19, 2024

(87) PCT Pub. No.: WO2023/009305

PCT Pub. Date: Feb. 2, 2023

(65) Prior Publication Data

US 2024/0235332 A1 Jul. 11, 2024

Related U.S. Application Data

(60) Provisional application No. 63/227,033, filed on Jul. 29, 2021.

(51) Int. Cl.
*H02K 11/30* (2016.01)
*B60L 58/10* (2019.01)
(Continued)

(52) U.S. Cl.
CPC .......... *H02K 11/0094* (2013.01); *B60L 58/10* (2019.02); *H02K 1/12* (2013.01);
(Continued)

(58) Field of Classification Search
CPC .......... H02K 11/30; H02K 11/33; H02K 1/12; H02K 11/0094; B60L 53/66; B60L 53/20;
(Continued)

(56) References Cited

U.S. PATENT DOCUMENTS 5,216,402 A * 6/1993 Carosa .................... B60L 53/12 336/83
2003/0193250 A1 10/2003 Maslov et al.
(Continued)

FOREIGN PATENT DOCUMENTS

| | | |
|---|---|---|
| KR | 10-2017-0110885 A | 10/2017 |
| KR | 10-1841446 B1 | 3/2018 |
| WO | 2017-037843 A1 | 3/2017 |

OTHER PUBLICATIONS

International Search Report in the parent PCT application No. PCT/US2022/036800, dated Nov. 3, 2022.
(Continued)

*Primary Examiner* — Alexander A Singh
(74) *Attorney, Agent, or Firm* — Chen Yoshimura LLP

(57) ABSTRACT

An in-vehicle power supply system includes multiple power pods each holding multiple power cells, and a mechanical transport system to exchange power cells. Each power cell includes a controller and a power converter with a coil wound around a through hole. Each power pod includes a controller and a power converter with a magnetic core having posts that pass through the through holes of the power cells. Multiple parts of the magnetic core can be opened to allow power cell exchange. The power cells held by each power pod are magnetically parallel to each other and coupled to the power pod by magnetic field coupling. Also disclosed is an electric motor incorporating such power cells as a part of its stator, with coils of the power cells disposed around parts of the stator's magnetic core to function as coils of the stator.

29 Claims, 14 Drawing Sheets

(51) Int. Cl.

| | |
|---|---|
| ***H02K 1/12*** | (2006.01) |
| ***H02K 11/00*** | (2016.01) |
| ***H02K 11/33*** | (2016.01) |
| *B60L 50/60* | (2019.01) |
| *B60L 53/20* | (2019.01) |
| *B60L 53/80* | (2019.01) |
| *H01M 10/42* | (2006.01) |

(52) U.S. Cl.
CPC ............. *H02K 11/30* (2016.01); *H02K 11/33* (2016.01); *B60L 50/60* (2019.02); *B60L 53/20* (2019.02); *B60L 53/80* (2019.02); *H01M 10/425* (2013.01); *H01M 2010/4278* (2013.01)

(58) Field of Classification Search
CPC .......... B60L 53/80; B60L 58/10; B60L 50/64; B60L 50/60; B60L 53/14; B60L 15/20; B60L 50/66; H01M 10/425; H01M 2010/42; Y02T 10/7072; Y02T 10/70; Y02T 90/14; G06N 20/00
USPC ........................................ 310/216.007, 68 R
See application file for complete search history.

(56) References Cited

U.S. PATENT DOCUMENTS

2009/0256430 A1* 10/2009 Farnia .................... H02K 1/148 310/44
2010/0101879 A1 4/2010 McVickers
2011/0204845 A1 8/2011 Paparo et al.

OTHER PUBLICATIONS

Written Opinion in the parent PCT application No. PCT/US2022/036800, dated Nov. 3, 2022.
European Search Report, dated May 26, 2025, in a counterpart or related EP patent application, No. EP 22850078.1.

* cited by examiner 14
142A
142C
145
142D
143
142B 82
12

81
82A
82B
82C
82D
12

81
82
12
83

91
92A
12
92B
12

92
92A
12
91
128
92B
93
90

91
92A
12
92C
92B 92A
91
12

92A
92B
12

POWER SUPPLY SYSTEM FOR ELECTRIC VEHICLES

BACKGROUND OF THE INVENTION

Field of the Invention

This invention relates to a power supply system for electrical vehicles, and in particular, it relates to a battery power supply system for electrical vehicles and related power cell exchange and charging station, as well as related methods of operation and utilization.

Description of Related Art

Electrical vehicles are becoming more popular. However, current battery based power supply systems for electrical vehicles still suffer from problems such as insufficient power capacity which limits the range of the vehicle, long charging time for end users, battery life, lack of flexibility, safety and reliability issues, etc.

SUMMARY

Embodiments of the present invention provide a power supply system for electric vehicles. The power supply system includes the following parts: an in-vehicle power supply system, and a power cell exchange and charging station and related power system. Embodiments of the present invention also provide various methods of operating and utilizing the power supply system.

The power supply system according to embodiments of the present invention has the following advantages and benefits. It can reduce the time required for power transfer to an electric vehicle. It can alleviate concerns of electric vehicle owners and end users regarding battery life span. It can reduce purchase and maintenance cost of electric vehicle owners and end users. It can reduce the pressure on electricity distribution network due to ever increasing charging station, especially super charging stations. It can facilitate adoption of electric vehicles. It can improve reliability of electric vehicles. It can extend lifetime (cycle time) of battery and slow down degradation of battery performance. It can improve vehicle performance. It can increase flexibility and enhance robustness of power grid within an area. It can improve power supply performance, quality and stability at homes in which electric vehicles are kept and reduce cost of energy for homeowners.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a power supply system, which includes: a plurality of power cells, each power cell having one or more battery cells and a cell-side power converter, the power cell defining a through hole, the cell-side power converter including a coil wound around the through hole; at least one power pod, each power pod having a pod-side power converter which includes a magnetic core and a coil wound around a part of the magnetic core, the magnetic core including a plurality of posts each configured to pass through the though hole of one of the power cells, wherein the magnetic core is divided into a plurality of pieces, wherein a first subset of the plurality of pieces is moveable relative to a second subset of the pieces to reconfigure the magnetic core between a closed state and an open state, wherein in the closed state, the plurality of pieces mechanically contact each other to form closed magnetic circuits without air gap, and in the open state, some pieces among the first and second subsets that mechanically contact each other in the closed state are mechanically separated, wherein the open state is configured to allow each power cell to be moved into a position around a post or away from the post; wherein each power cell is held by one of the at least one power pod and is configured to form magnetic field coupling with the power pod to transfer power bidirectionally between the power cell and the power pod; a system power bus electrically coupled to each power pod; and a mechanical transport system configured to mechanically move the first subset of the plurality of pieces of the magnetic core and to mechanically move the power cells relative to the at least one power pod.

In some embodiments, the magnetic core of each power pod further includes: a first end member, a second end member, and a pod-side post, wherein in the closed state, the first end member and the second end member face each other with the pod-side post and the plurality of posts disposed between and in contact with the first and second end members, and wherein in the open state, the second end member is separated from the pod-side post and the plurality of posts.

In some embodiments, each power cell further includes a cell-side control unit coupled to the cell-side power converter and configured to control the cell-side power converter, and each power pod further includes a pod-side control unit coupled to the pod-side power converter and configured to control the pod-side power converter.

In some embodiments, either: the cell-side control unit of each power cell is configured to measure a frequency and a phase of a magnetic field in the post of the magnetic core that passes through the through hole of the power cell and to control the cell-side power converter based on a result of the measurement, or: the cell-side control unit of each power cell is configured to receive, from the pod-side control unit, information regarding frequency and phase of a magnetic field in the magnetic core and to control the cell-side power converter based on the received information.

In some embodiments, the power pod and the power cells held by the power pod are configured to transfer power from the power pod to at least one of the power cells using magnetic field coupling of a first frequency and to transfer power from at least another one of the power cells to the power pod using magnetic field coupling of a second frequency which is different from the first frequency.

In some embodiments, the power pod and the power cells held by the power pod are configured to simultaneously transfer power from at least one of the power cells to at least another one of the power cells and to the power pod using magnetic field coupling.

In some embodiments, the cell-side control unit of each power cell and the pod-side control unit of the power pod that holds the power cell are configured to communicate data and commands with each other by magnetic field coupling.

In some embodiments, the magnetic field coupling used to transfer power bidirectionally between the power cells and the power pod has first frequencies, and the magnetic field coupling used to communicate data and commands between the cell-side control units and the pod-side control unit has second frequencies which are different from the first frequencies.

In some embodiments, the cell-side control unit of each power cell is configured to read or record history and status information relating to operation of the power cell and to communicate the recorded history and status information to the pod-side control unit of the power pod that holds the power cell, wherein the history and status information includes one or more of: battery cell status, power cell identification or serial number, power cell model number, charge and discharge status of power cell, power cell exchange and charging station or pump information, power cell charge or discharge lock or unlock status, and power cell permanent disable status.

In some embodiments, the power supply system includes a plurality of power pods, wherein at least some of the power pods include a different number of power cells than at least some other power pods.

In some embodiments, the power supply system further includes a system controller electrically coupled to and configured to communicate with the pod-side control unit of each power pod, wherein the system controller is configured to perform load balancing among the plurality of power pods and power cells.

In some embodiments, all power cells have the same mechanical size, and have the same or different energy storage capacities.

In some embodiments, each power cell further includes a battery cell disable agent.

In some embodiments, the power supply system further includes an enclosure that encloses the plurality of power cells, the at least one power pod, and the mechanical transport system, wherein the enclosure has an access port, and wherein the mechanical transport system is configured to move any power cell from any power pod to the access port or from the access port to any power pod or between power pods.

In another aspect, the present invention provides a method of operating an in-vehicle power supply system, including: providing a plurality of power cells, each power cell having one or more battery cells, a cell-side power converter and a cell-side control unit, the power cell defining a through hole, the cell-side power converter including a coil wound around the through hole; providing at least one power pod, each power pod having a pod-side power converter and a pod-side control unit, the pod-side power converter including a magnetic core and a coil wound around a part of the magnetic core, the magnetic core including a plurality of posts each configured to pass through the though hole of one of the power cells, wherein the magnetic core is divided into a plurality of pieces, wherein a first subset of the plurality of pieces is moveable relative to a second subset of the pieces to reconfigure the magnetic core between a closed state and an open state, wherein in the closed state, the plurality of pieces mechanically contact each other to form closed magnetic circuits without air gap, and in the open state, some pieces among the first and second subsets that mechanically contact each other in the closed state are mechanically separated, wherein the open state is configured to allow each power cell to be moved into a position around a post or away from the post; by a mechanical transport system, configuring the magnetic core in the open state, loading some of the power cells into the power pod, and then configuring the magnetic core in the closed state, wherein in the closed state, the through hole of each loaded power cell is disposed around one of the plurality of second posts and the magnetic core forms a closed loop; transferring power to the power pod from a first one of the power cells loaded in the power pod by magnetic field coupling; and transferring power from the power pod to the first power cell or a second one of the power cells loaded in the power pod by magnetic field coupling.

In some embodiment, the method further includes: unloading depleted or partially depleted power cells from the in-vehicle power supply system and loading charged power cells from a power cell exchange station.

In some embodiment, the transferring of power to the power pod from the first power cell uses magnetic field signals of a first frequency, and the transferring of power from the power pod to the second power cell uses magnetic field signals of a second frequency which is different from the first frequency, and wherein the transferring of power to the power pod from the first power cell and the transferring of power from the power pod to the second power cell occur simultaneously.

In some embodiment, the method further includes: while transferring power to the power pod from the first power cell, simultaneously transferring power to a third one of the power cells from the first power cell.

In some embodiment, the method further includes: by the power pod or some of the power cells, generating magnetic fields for power transmission; by the cell-side power converter of each power cell, or by the pod-side power converter of the power pod, converting magnetic power to electrical power or converting electrical power to magnetic power; by the pod-side control unit of the power pod, controlling the pod-side power converter; and by the cell-side control unit of each power cell, controlling the cell-side power converter based on either: measuring a frequency and a phase of a magnetic field in the post of the magnetic core that passes through the through hole of the power cell, or: receiving, from the pod-side control unit, information regarding a frequency and a phase of a magnetic field in the magnetic core.

In some embodiment, the method further includes: by the cell-side control unit of each power cell, reading and recording history and status information relating to operation of the power cell, wherein the history and status information includes one or more of: battery cell status, power cell identification or serial number, power cell model number, charge and discharge status power cell, power cell exchange and charging station or pump information, power cell charge or discharge lock or unlock status, and power cell permanent disable status; and communicating data and commands between the pod-side control unit of a power pod and the cell-side control unit of each power cell in contact with the power pod, by magnetic field coupling using a third frequency which is different from the first and second frequencies.

In another aspect, the present invention provides an electric motor, including: a rotor; a magnetic core, including a plurality of first end pieces disposed around the rotor, one or more second end pieces spaced apart from the first end pieces, and a plurality of posts each extending between and in contact with one of the plurality of first end pieces and a corresponding one of the one or more second end pieces; and a plurality of power cells, each power cell including one or more battery cells and a cell-side power converter, the power cell defining a through hole, the cell-side power converter including a coil wound around the through hole, wherein one of the plurality of posts of the magnetic core passes through the through hole of the power cell, wherein the magnetic core and the coils of the plurality of power cells form a stator of the electric motor.

In some embodiments, the one or more second end pieces are spaced apart from the first end pieces in a radial direction of the rotor, and wherein each of the plurality of posts extend in the radial direction between the one of the plurality of first end pieces and the corresponding one of the one or more second end pieces.

In some embodiments, the one or more second end pieces are spaced apart from the first end pieces in an axial direction of the rotor, and wherein each of the plurality of posts extend in the axial direction between the one of the plurality of first end pieces and the corresponding one of the one or more second end pieces.

In some embodiments, the plurality of first end pieces, the one or more second end pieces, and the plurality of posts are divided into at least a first subset of pieces and a second subset of pieces, wherein the first subset of pieces are moveable relative to the second subset of pieces to reconfigure the magnetic core between a closed state and an open state, wherein in the closed state, each of the plurality of posts mechanically contacts one of the plurality of first end pieces and a corresponding one of the one or more second end pieces, and in the open state, some pieces among the first and second subsets that mechanically contact each other in the closed state are mechanically separated, wherein the open state is configured to allow each power cell to be moved into a position around a post or away from the post.

In some embodiments, each power cell further includes a cell-side control unit coupled to the cell-side power converter and configured to control the cell-side power converter, and the electric motor further comprises a motor side controller, communicatively coupled to the cell-side control unit of each of the plurality of power cells, configured to communicate control signals and data with the cell-side control unit, and the cell-side power converters of the plurality of power cells convert electrical energy stored in the power cells into magnetic fields configured to cause the rotor to rotate.

In some embodiments, the motor side controller is communicatively coupled to the cell-side control unit of each of the plurality of power cells by magnetic field coupling via the magnetic core.

In some embodiments, each power cell further includes an auxiliary communication port, wherein the motor further includes a plurality of communication towers, and wherein the motor side controller is communicatively coupled to the cell-side control units of the plurality of power cells via the communication towers and the auxiliary communication ports of the power cells using a magnetic field or electromagnetic waves.

In some embodiments, the motor is an induction motor, a switched reluctance motor, or a synchronized reluctance motor.

In some embodiments, the motor side controller is programmed with machine learning and artificial intelligence.

It is to be understood that both the foregoing general description and the following detailed description are exemplary and explanatory and are intended to provide further explanation of the invention as claimed.

BRIEF DESCRIPTION OF THE DRAWINGS

FIG. 4 shows an exploded view without inserted power cells. FIGS. 5A and 5B show the power pods in open and closed states, respectively, without inserted power cells, and FIGS. 5C and 5D show the power pods in open and closed states, respectively, with inserted power cells.

FIGS. 7A-10D schematically illustrate electric motors configured to have power cells directly loaded into them according to other embodiments of the present invention.

DETAILED DESCRIPTION OF PREFERRED EMBODIMENTS

Figure 1:
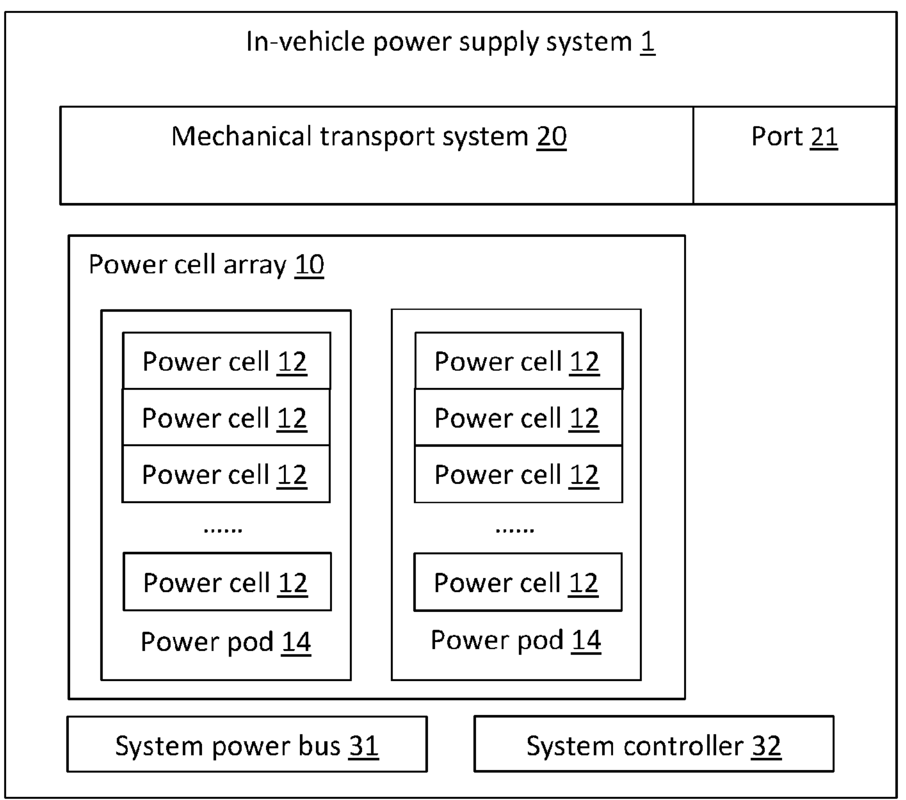
FIG. 1 is a schematic block diagram which illustrates an overall structure of an in-vehicle power supply system according to embodiments of the present invention.

In co-pending U.S. patent application Ser. No. 17/169,416, filed Feb. 6, 2021 (the '416 application), a power supply system was introduced, which includes an array of power pods and the system power supply bus. Each power pod can hold an array of power cells up to a predefined number. Power or energy can be transferred bidirectionally between the system power supply bus and any power pod connected to it. Power or energy can also be transferred bidirectionally between a power pod and any power cell held in the power pod. The power or energy transfer between power pods and the power cells held by them occurs through the magnetic fields which link the power pods and the power cells. In addition, data and control signals can be transferred between power pods and the power cells held by them through magnetic fields. By using the link based on magnetic fields, power transfer is more reliable even with replaceable power cells in hash environments. In addition, the outputs of multiple power cells can be summed together easily so that high power output power systems can be built with simple scaling up without complex structure which may introduce safety issues. However, this power system has some disadvantages as discussed below.

First, both the power cell side and power pod side include magnetic cores. This may limit the performance and flexibility of the power system in different applications. In different applications, the material used to make the magnetic core, which functions to allow magnetic flux to pass through to form the power or energy link and the data link between power pods and power cells, may be different. Some of the materials like ferrite may be able to be operated at a frequency up to several hundred megahertz, but its relative permeability may only be up to a few tens of thousands. They may reach magnetic saturation at a point below 1 T. For some other materials like certain alloys, their operation frequency may only reach a few hundred kilohertz, but their relative permeability can go beyond one hundred thousand. And they may reach magnetic saturation at a point beyond 1 T. If the design of a power cell has an integrated magnetic core, it may limit its applications and usage cases.

In the '416 application and the present application, the term magnetic core refers to a core made of a magnetic material which has a high magnetic permeability, for example, a ferromagnetic metal such as iron, or ferrimagnetic compounds such as ferrites. Any suitable materials may be used to form the magnetic core.

Second, to reduce magnetic reluctance and improve the power density of the power supply system, the air gaps between the magnetic cores of a power cell and a power pod need to be minimized in the above-described power system. This will require a tight fitting tolerance for both the magnetic core of the power cell and that of the power pod. Since the power cells need to be transferred between vehicles and power cell exchange facilities, any damage during such transfer to the magnetic core in the power cells may cause performance degradation of the power supply system where the power cells with damaged magnetic cores are used. In addition, the magnetic cores add weight to power cells, which may put more stress to the mechanical structures either inside the vehicle or in the power cell exchange facility when the power exchange and transfer is conducted at a high speed.

To solve the issues discussed above, embodiments of the present invention provide a new vehicle power supply system, in which all parts of the magnetic core are located on the power pods. On the power cell side, there is no longer any magnetic cores.

The overall structure of an in-vehicle power supply system 1 according to a first aspect of the present invention is schematically illustrated in FIG. 1. This overall structure is the same as that shown in FIG. 1 of the '416 application. The power supply system 1 in each electric vehicle includes a power cell array 10 which contains a large number of power cells 12, preferably of the same mechanical size. The power cell arrays in different electric vehicles may have different capacities for holding different numbers of power cells. This difference enables electric vehicles of different types and sizes to use power cells of the same mechanical size. Here, the mechanical size refers to the mechanical dimensions of the power cell, not the energy storage capacity of the power cell. Power cells with the same mechanical size may have different energy storage capacities and performance; e.g., some may be designed to deliver large amount of energy within a short period of time, while others may be designed for light loads and have longer charge holding period (i.e. low self-discharge) and longer life span.

The in-vehicle power supply system 1 also has a built-in mechanical transport system 20 to hold power cells 12 and physically move any power cell inside the system to an access port 21 of the in-vehicle power supply system which extend to an opening or port of the vehicle for purposes of power cell exchange. The mechanical transport system 20 includes both support structures for supporting and securing the power cells in place and a conveying system for moving the power cells; it is constructed such that any power cell 12 in the power supply system can be mechanically moved in any directions e.g., x, y, and z directions. The mechanical transport system 20 has the ability to move any power cell in the array to the port 21 and put a power cell from the port 21 to any location in the power cell array. At a power cell exchange station, moving power cells 12 to the port 21 and moving power cells from the port into the power cell array can happen within different periods of time, or at the same time (for example, if the port 21 is sufficiently large to accommodate two or more power cells passing through it simultaneously). The latter will help shorten the period of exchanging the power cells in the power cell array in the vehicle. This will shorten the period of time power is transferred to the vehicle at a power cell exchange station.

The mechanical transport system 20 may have any suitable structure so long as it can meet the requirements described in this disclosure. Mechanical support and conveying systems are widely used in manufacturing, transportation, logistics and countless other industrial and other fields. Those of ordinary skill in the relevant art can implement a mechanical transport system 20 suitable for the in-vehicle power supply system, based on descriptions of this disclosure, without undue experimentation. The mechanical transport system 20 may include, for example and without limitation, some of the following mechanical components: guide rails, belts, chains, gears, racks, levers, rollers, pivots, clamps, springs, magnets, electromagnets, motors and actuators, robotic arms, etc., and their combinations. The mechanical transport system 20 also includes all necessary control components, which may be electrical circuitry and/or controllers electrically coupled to a system controller 32 (described in more detail later), to control the movements of the various mechanical components of the mechanical transport system.

The power cell array 10 in an electric vehicle can be fully or partially filled with power cells 12 depending on the needs of the end user. An electric vehicle can operate normally with a partially filled power cell array. During operation, all or part of the power cells held in the power cell array can provide power to the vehicle. A strategy can be designed to drain power from the power cells in the power supply system in a specified order or based on specified criteria. The in-vehicle power supply system 1 is capable of draining power from designated power cells 12 in its power cell array 10 and exchanging information between other components of the vehicle and each power cell. The in-vehicle power supply system can also transfer power from some power cells to other power cells within the power cell array.

Figure 2:
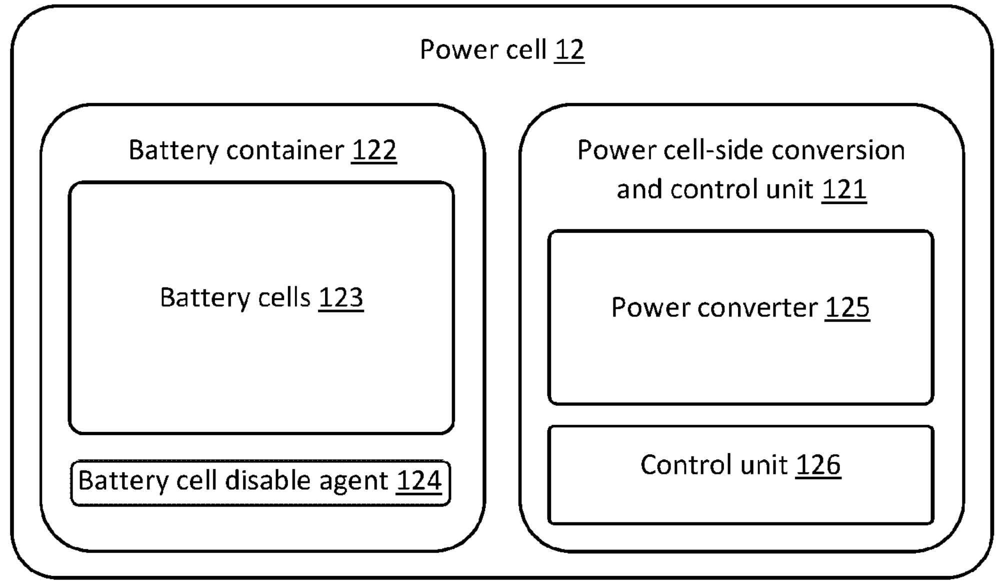
FIG. 2 is a schematic block diagram of a power cell of the in-vehicle power supply system according to embodiments of the present invention.

FIG. 2 shows an example of block diagram of a power cell 12 according to an embodiment of the present invention. The power cell 12 includes a power cell-side conversion and control unit 121 and a battery container 122. Battery cell or cells 123 are held within the battery container 122. In addition, an optional battery cell disable agent 124 (for example a chemical substance for a chemical battery) can also be included in the battery container. This battery cell disable agent can improve the safety of the in-vehicle power supply system and the safety of the vehicle. In an emergency, e.g., when sensors in the vehicle or in the power supply system 1 detect a possible collision, or an extreme high temperature, which may cause fire in battery cells, the power cell-side conversion and control unit 121 will activate the battery cell disable agent 124 to chemically disable the battery cell 123 if the battery cell in the power cell is a chemical battery. In another example, the power cell-side conversion and control unit 121 may activate the battery cell disable agent 124 when a leakage of the chemical battery cells is detected, or when other defects of the chemical battery cells is detected.

Two sub-components in the power cell-side conversion and control unit 121 are a power converter 125 and a control unit 126. The control unit 126 (which includes electronic circuits and/or programmable controllers and/or other suitable components) controls the operation in the power cell 12 and communicates with a pod-side conversion and control unit (described later) so that information can be exchanged between the power cell 12 and other components of the in-vehicle power supply system 1. In addition, control commands can be sent from other components of the power supply system 1 to the control unit 126 of each power cell 12.

The control unit 126 may have the following additional functions: charge and discharge control function, protection function control, battery health monitor function (including structure integrity check which may include battery container leakage detection function), battery history recording function such as battery charge and discharge history recording function, energy use history recording function (which car used the battery cell in which time interval; when the battery cell is discharged and when it is charged, etc.), exchange station history recording function (at which exchange station the battery cell is charged, when it is put into a vehicle, etc.), error or malfunction history recording function (when and where it had malfunction), usage or life of the battery cell recording function (occurrences of over current during discharge, over or under temperature during charge or discharge, strong impact history, etc.), security lock function (power cells can only be activate after authorized exchange, and car can be deeply locked by locking the battery cells in it), battery cell disable agent control, etc. The authorization can also be made through the control system in the vehicle which communicates with the power exchange station or the power cell supplier through any wireless communication network e.g., Wi-Fi or cell phone network. These various history recording functions may be performed by a processor with a memory within the control unit 126, where the information being recorded is obtained from sensors within the power cell 12 and elsewhere in the vehicle as well as from external information sources such as the exchange station. The various history recording functions listed above may be implemented in methods generally known in the art and are not described in detail here.

Figures 3A, 3B, 4:
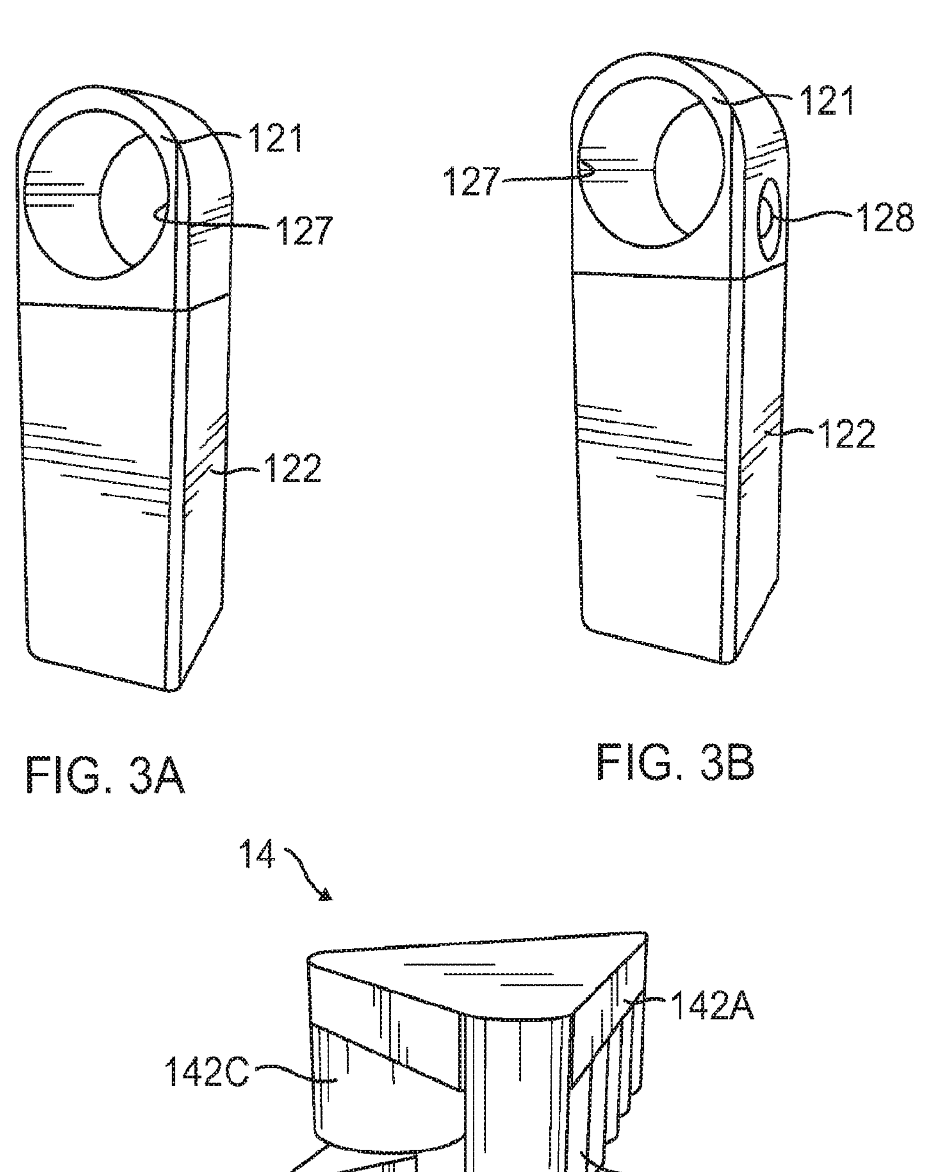
FIGS. 3A and 3B schematically illustrate the structure of a power cell according to embodiments of the present invention.
FIGS. 4 and 5A-5D schematically illustrate an exemplary power pod according to embodiments of the present invention.

The operation of the power cell controlled by the control unit may include but not limited to: getting operation commands from the power pod which holds the power cell; starting the power converter and sending power to power pod from the power cell; starting the power converter and receiving power from power pod to the power cell and use the power to charge the battery cells; transferring information between the power cell and the power pod, the information may include but not limited to: battery cell status in a power cell, power cell identification or serial number, power cell model number, charge and discharge status of a power cell, power cell exchange and charging station or pump information, power cell charge or discharge lock or unlock status, power cell permanent disable, the signal frequencies for power transfer, the signal frequencies for communications of different purposes, etc.; monitoring the operation of the power cell and logging the information to its built-in storage; achieving protection functions within the power cell which may include but not limited to: over temperature protection, internal circuit over voltage, under voltage protection, over current protection; power cell lock down function under the situations which may include but not limited to: unauthorized information reading and writing, unauthorized requests of sending or receiving power, hacking of any physical form; permanently disabling battery cells using the internal battery cell disable agent under condition which may include but not limited to: detection of excess acceleration which may relate to vehicle crash, or unexpected physical hit to the power cell, or detection of excess of excess temperature which may relate to fire in the vehicle or the battery exchange pump or facility, or receiving battery cell disable command from upper level sub-system such as power pod which hold the power cell. In the embodiment of FIGS. 3A and 3B, the lower part of the power cell contains the battery container. The battery container holds the battery cells and the battery cell disable agent. The battery cells can be any type of energy storage cells which can hold energy and generate or provide electricity. The energy storage cell can be for example any kind of chemical batteries or super capacitors.

The power converter 125 is controlled by the corresponding control unit 126, and functions to drain power from the battery cells 123 and convert the power from an electrical form to a magnetic field form. It may contain one or more coils (not shown in the drawings) wound around a through hole 127 that passes through the power cell (see FIGS. 3A and 3B). As will be described in more detail below, when the power cell is held by a power pod, a part of the magnetic core of the power pod will pass through the through hole 127. AC electrical signals generated by the power converter 125 is used to drive the coil to generate a magnetic field in the magnetic core. The power converter 125 can also drain power from the magnetic field in the core and use it to power the control unit 126 and charge the battery cells 123. Battery cell protection circuits are also included in the converter 125 to protect the battery cell and the control unit. One implementation example of the converter 125 includes an oscillator which drains power from the battery cells 123 and generates AC electric signals to drive the coil, and a rectifier circuit which generates DC electrical signals to charge the battery cells.

The AC signals which is used to transfer power from the power cells to the power pod (described in more detail later) which holds the power cells or from the power pod to the power cells, or between the power cells held by the same power pod, may have different frequencies from that of the signals used for the data communication between power cells and power pod in the in-vehicle power supply system. This ensures that both power transfer and data communication between power cells and power pod can be conducted at that same time without interference from each other.

FIG. 3A schematically illustrates an exemplary structure of a power cell 12. Please note the drawing is not necessarily to scale; the purpose of the figure is to show the way a power cell 12 may be constructed. The through hole 127 of the power cell 12 is surrounded by the power converter 125 and control unit 126 of the power cell-side conversion and control unit 121, and the battery container 122 is joined to the power cell-side conversion and control unit 121. Note that the control unit 126 is not required to be disposed around the through hole; only the coils of the power converter 125 is required to be disposed around the through hole 127. Also, the through hole 127 may have any suitable cross-sectional shape, such as round, oval, polygonal, etc.; FIG. 3A illustrates a round shape as one example.

FIG. 3B schematically illustrates another exemplary structure of a power cell 12, which includes additional auxiliary communication ports 128 coupled to the power conversion and control unit 121. The auxiliary communication ports can be added on one or more sides of the power conversion and control unit. The auxiliary communication ports can conduct communication between the power cell 12 and external devices via either magnetic field or electromagnetic wave of any wavelength, e.g., radio wave or light wave in the inferred range. The auxiliary communication ports are placed so that if a magnetic field is used for information transfer, the direction of the magnetic field is perpendicular to the direction of the magnetic field which is used for power or energy exchange between power cell and external devices such as a power pod. In this way, the interferences due the magnetic field used for power or energy transfer will be reduced. The auxiliary communication port or ports 128 will be useful when the bandwidth is limited due to limited operation frequency range of the magnetic core or due to strong interference from the magnetic field used for power or energy transfer which cannot be easily reduced and which causes communication issues for the power cell.

Figure 6:
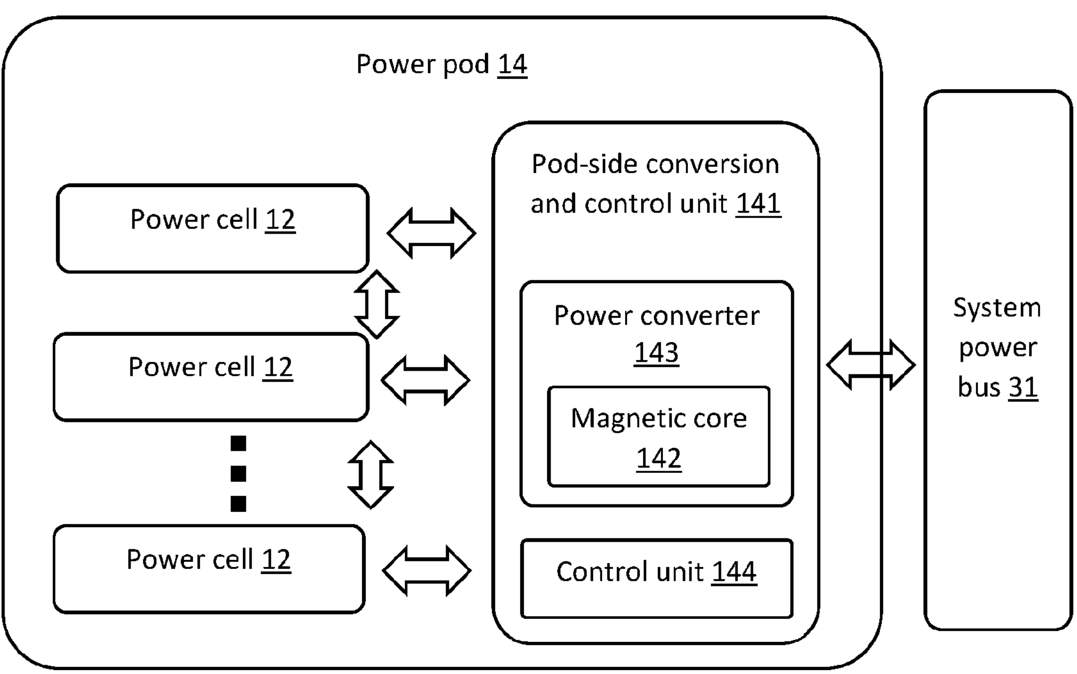
FIG. 6 is a schematic block diagram of a power pod with power cells inserted according to embodiments of the present invention.

In the in-vehicle power supply system, the power cell array 10 is formed by power cells 12 held in one or more power pods 14 (see FIG. 1). Each power pod 14 can hold up to a predefined number of power cells 12. An example of a power pod 14 which can hold up to six power cells 12 is shown in FIGS. 4 (exploded view, without inserted power cells), 5A and 5B (open and closed states, respectively, without inserted power cells), and 5C and 5D (open and closed states, respectively, with inserted power cells). FIG. 6 shows is a schematic block diagram of a power pod 14 holding a number of power cells 12.

As shown in FIG. 6, each power pod 14 includes a pod-side conversion and control unit 141, which includes a pod-side power converter 143 and a pod-side control unit 144. The power converter 143 is electrically coupled to a system power bus 31, and includes a magnetic core 142 and one or more coils (not shown) wound around a part of the magnetic core. The power converter 143 functions to convert power between an electrical form and a magnetic field form. The direction of the power transfer can be either from system power bus 31 to magnetic core 142, or from magnetic core 142 to system power bus 31. Similar to the power converter 125 of the power cell 12, the power converter 143 may include an oscillator and a rectifier circuit. Through the power converters 125 and 143 and the magnetic core 142, power is transferred between the system bus 31 and the power cells 12 via inductive coupling.

In FIGS. 4 and 5A-5D, a simplified structure drawing of a power pod 14 is shown. The magnetic core 142 in the power pod 14, which is made of a magnetic material with a high magnetic permeability, such as ferromagnetic or ferrimagnetic materials, includes two end members (preferably plate-shaped) 142A and 142B arranged facing each other (and in parallel if they are plate-shaped), and a plurality of posts 142C and 142D disposed between and mechanically contacting the two end members. In the illustrated embodiment, the posts extend substantially parallel to each other, but this is not required. The plurality of posts includes a first post 142C and a plurality of second posts 142D. The first post 142C passes through a through hole 145 of the pod-side power converter 143, where coils of the pod-side power converter are wound around the through hole. Each of the plurality of second posts 142D is adapted to pass through the through hole 127 of a power cell 12. For convenience, in the descriptions below, the first post 142C that passes through the pod-side power converter 143 is sometimes referred to as the "pod-side magnetic core (or post)" and each second post 142D that passes through the cell-side power converter 125 is sometimes referred to as a "cell-side magnetic core (or post)," even though it should be understood that the second posts 142D are an integral part of the power pod, not the power cell.

The magnetic core 142 is mechanically divided into two separate parts, 142-1 and 142-2. One of the two parts (e.g. 142-1) includes one of the end members (e.g. 142A) and the plurality of posts 142C, 142D fixedly joined to the end member, and the other one of the two parts (e.g. 142-2) includes the other one of the end members (e.g. 142B). When the two parts are brought together in the closed state (with the assistant from the mechanical transport system), the plurality of posts are brought into contact with the other end member, and a closed magnetic circuit is formed by the two parts without air gap. Note that while in the embodiment of FIGS. 4 and 5A-5D all posts 142C and 142D are fixedly joined to one of the end member, in alternative embodiments, some of the posts may be fixedly joined to one end member to form the first part and the other posts may be fixedly joined to the other end member to form the second part of the magnetic core.

Figures 5A, 5B, 5C, 5D:
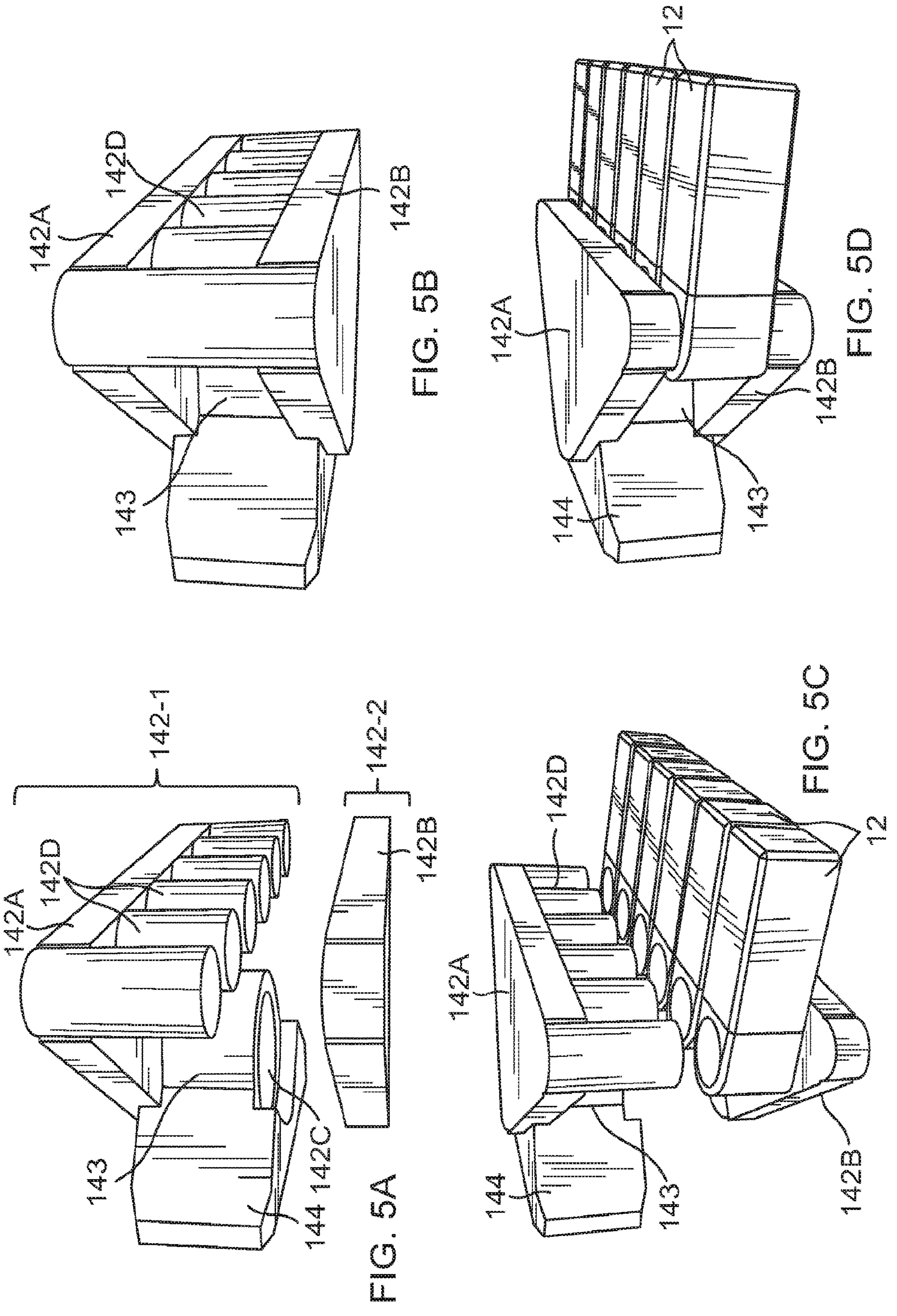

Other ways of mechanically dividing the components of the magnetic core 142 into two parts may be employed, or the magnetic core 142 may be mechanically divided into more than two parts that are moveable relative to each other, so long as the two or more parts can be mechanically moved relative to each other into an open state where the power cells can be freed from the magnetic core and be exchanged. For example, each second post 142D may be formed of two segments, respectively attached to the first and second end members 142A and 142B, and the first and second end members along with the respective segments of the second posts are moveable away from each other to allow power cell exchange. In another example, the second posts 142D pass through respective through holes in the first or the second end member 142A or 142B, and the second posts are moveable longitudinally through the through holes, so that they can be withdrawn from the through holes of the power cells to allow power cell exchange. In another example, instead of separating in the longitudinal direction of the posts as shown in FIG. 5A, the second end member 142B may move laterally (i.e. in a direction perpendicular to the posts), or both longitudinally and laterally, away from the lower ends of the second posts 142D. Further, there are many other ways to spatially arrange the various components of the magnetic core 142 in the closed state, and corresponding ways of mechanically dividing these components into two or more parts in the open state to allowed cell exchange. The invention is not limited to any particular spatial and mechanical arrangements.

More generally, the magnetic core of the power pod includes multiple pieces of magnetic materials, including a plurality of posts each configured to accommodate a power cell around it (i.e. passing through the through hole of the power cell), where at least some of the multiple pieces are moveable relative to some other pieces so that the magnetic core is reconfigurable between a closed state (for power transfer operations) and an open state (for power cell exchange). In the closed state, the multiple pieces mechanically contact each other to form closed magnetic circuits without air gap. In the open state, some pieces normally in contact with each other are mechanically separated, so that power cells can be moved into or away from their intended positions around the posts. In particular, for example, one or both ends of each post is separated from the other pieces in the open state.

The pod side control unit 144 controls the operation of the power pod and communicates with the system controller 32 via the power supply bus to ensure the proper operation of the whole vehicle power supply system. The pod side control unit 144 also controls the actuators in the mechanical transport system 20 (not shown in FIGS. 4 and 5A-5D, but see FIG. 1) to move one or both parts 142-1 and 142-2 of the magnetic core 142 based on operation requirements. In FIGS. 4, 5A and 5B, the power pod 14 shown is empty. When power cells need to be put into the power pod or removed from the power pod, the pod side control unit 144 will control the actuator in the mechanical transport system 20 to first separate the two parts of the magnetic core. Then it will notify the system controller 32 to either move power cells into the power pod or remove the power cells from the power pod using the mechanical transport system. When the movements of power cells are completed, the system controller 32 will notify the pod side control unit 144, which will control the actuators in the mechanical transport system to bring the two parts of the magnetic core together to form the closed state. FIG. 5D shows a closed state of the power pod 14 with the power cells 12 inserted, where the plurality of second posts 142D pass through the through holes 127 of the power cells. In such a state, the power pod 14 is ready for provide power or energy to the power system bus or receive power or energy from the power system bus. The pod-side control unit 144 will send a ready for operation signal to the power system controller 32.

As mentioned earlier, in FIGS. 5A and 5B, an empty power pod in a magnetic core open state and closed states are illustrated respectively. In FIG. 5C, a fully loaded power pod which is filled by power cells but the magnetic core is in open state is presented. In FIG. 5D, the same power pod in the state that the two parts of the magnetic core are brought together is presented. In this state, a closed magnetic circuit is formed without any air gap which tends to cause high magnetic reluctant in the magnetic circuit. FIG. 4 and FIGS. 5A-5D only give one simple example of how to arrange the magnetic core into different parts so that power cells can be moved into or out from a power pod and how a closed magnetic circuit without air gap can be formed after power cells are put input a power pod so that the power pod is ready for operation. Other suitable configurations may be employed.

In preferred embodiments, on the power cell side, the power converter include the coil or coils and related circuitry for power conversion and bidirectional data transfer or communication. In preferred embodiments, the coil is limited to certain dimensions. That is, the size of the coil or coils should be limited within a specific length, and the inner size of the coils (for example, the inner diameter of a coil with a circular shape) should have a lower limit so that even with a package or protection cover of the coils, the diameter of the through hole 127 that goes through the coil has a lower limit not lower than a certain value. This will ensure that the power cell-side magnetic core (second posts 142D) with a size up to the certain value can readily pass through the through hole 127. The second post 142D of the magnetic core has an outer size upper limit so that it can pass through the through hole 127 of the power cell. The second post 142D should also have a minimum length that is large enough that it can run through the length of the coils of the power cell and then touch the other end 142B of the magnetic core in the power converter of the power pod 14 and form a close loop. As mentioned earlier, in preferred embodiments, the magnetic core of the power pod can be made in two parts. In some embodiments, the magnetic core can be made as a part of a mechanical clamp structure which can be used to hold the power cells 12 in the power pod 14.

As seen from the above descriptions, in the power converter of the power cell 12, there is no long any magnetic core. This is one of the main differences between the power cell of the instant embodiment and the power cell described in the '416 application. The benefits of the structure of the instant embodiments include:

1. The weight of the power cells can be reduced. This makes it easier to move them within a vehicle or in a power cell exchange and charging station or between a vehicle and a power cell exchange pump in a power cell exchange and charging station. This also reduce power consumption of moving the power cells.

2. Eliminating the magnetic core from power cells also helps to make the power cells more compact.

3. Eliminating the magnetic core from power cells also provides more flexibility to the power system. In this way, based on different needs, on power pod side the magnetic core in the power converter can be made of different materials based on requirements. The same power cell can be used in power pod with the core made of different materials.

4. Eliminating the magnetic core from the power cells also makes the power cells more robust and able to withstand more severe impact and vibration.

The operations of the power cells and power pod are described now.

Power is transferred between power cells 12 and the power pod 14 which is holding the power cells through the magnetic field coupling established by the magnetic core 142. This power transfer can be bidirectional, i.e., either from a power cell 12 to the power pod 14, or from the power pod 14 to a power cell 12. This is schematically indicated in FIG. 6 by the double-ended arrows between the power cells 12 and the pod-side conversion and control unit 141. Further, bidirectional power transfer can happen within the same power pod 14 between power cells 12, e.g., power may be transferred from one power cell to the power pod and simultaneously from the power pod to a different power cell, or between power cells, as schematically indicated in FIG. 6 by the double-ended arrows between power cells 12. The ability to transfer power bidirectionally to different power cells simultaneously achieves load balancing, energy storage balancing and wear balancing among the power cells. All of these power transfers occur by magnetic field coupling via the magnetic core.

In addition to bidirectional power transfer, bidirectional communications of data (digital or analog) can also be established between power cells 12 and the power pod 14 through the aforementioned magnetic field coupling. As mentioned earlier, magnetic field couplings of different frequencies may be used for power transfer and data communication.

By using magnetic field coupling rather than direct electrical connections or contacts to achieve power transfer, the reliability of the power transfer between the power cell and the rest part of the power supply system is dramatically improved. Additional characteristics and benefits of the magnetic field coupling power transfer include the following.

First, unlike traditional battery bundles, the power cells according to embodiments of the present invention are not sensitive to moisture and dust. This makes the design suitable for harsh environment applications not limited to passenger cars. It will eliminate short circuits caused damages and creepage induced safety issues in battery bundles.

Second, this structure provides improved life span of power cells 12 due to removal of direct electrical contacts. It will eliminate corrosions in the contacts and related performance loss.

Third, the power output of a single power pod 14 can be easily increased by placing and operating more power cells 12 in parallel so that the magnetic fields from the power cells can be directly summed. By parallel arrangement of more power cells in a power pod, the maximum magnetic flex can be increased in the core if the core is not saturated. This will directly increase the voltage in the secondary winding (i.e. the coil in the power pod) when multiple power cells in parallel are outputting power. On the contrary, in order to increase the output power or voltage of a traditional battery bundle, the traditional battery cells typically need to be put in series rather than in parallel. Putting serval battery cells in series will increase the overall output voltage of the battery bundle, but the source impedance is also increased in proportion to the output voltage; in addition, when the output reach certain levels, safety issues need to be considered and better isolation need to be provided. In embodiments of the present invention, the parallel operation of power cells 12 also helps to improve the overall power supply system reliability in a vehicle. In existing electric vehicles, if one battery cell fails, the other battery cells in series with the failed battery cell will also quit working. Thus, one failed battery cell may cause tens or hundreds of battery cells that are still functional to quit operation. In the power supply system according to embodiments of the present invention, any power cell 12 with a malfunctioning battery cell 123 or any power cell which is otherwise malfunctioning can be disabled individually (e.g. via commands to the control unit 126) without affecting the operation of other power cells.

Fourth, the magnetic field power transfer eliminates arcing even under heavy loads. On the contrary, a traditional battery bundle needs high output voltage for heavy loads, which increases the chance of arcing. Arcing possibility may be a concern for certain applications.

Fifth, the assembling of power cells 12 in the power supply system is not sensitive to the polarity of the power cells. In the power supply system, the two end members 142A, 142B of each magnetic core 142 may be respectively referred to as first and second ends, and the two sides of each power cell 12 may be respectively referred to as the first and second sides, for convenience. Here, not being sensitive to the polarity of the power cell means that each power cell 12 may be placed in a power pod 14 with the first side being adjacent to either the first end 142A of the magnetic core, or the second end 142B of the magnetic core, without affecting the overall operation of the system. Traditional battery packs using battery cells need to make sure that all the battery cells are connected in the right way according to the polarity of each battery cell.

In the power supply system according to embodiments of the present invention, the magnetic polarity or the phase of the varying magnetic field of each power cell 12 can be changed easily under the control of the power cell-side conversion and control unit 121 based on how each power cell 12 is put into the power pod 14, and how other power cells in the same power pod operate. For each power cell 12, no matter how the power cell is placed into the power pod 14, the cell-side control unit 126 can first measure the magnetic field in the cell-side magnetic core 142D, for example using built-in magnetic field sensors. Then, if the power cell 12 is asked by the pod-side control unit 144 of the power pod 14 to provide power to the pod, the AC signal generated in the power converter 125 of the power cell can use the measurement results to synchronize the cell's output magnetic signal with the existing (i.e. previously measured) magnetic signal so that the magnetic field generated by this power cell is always synchronized (i.e. having identical frequencies and phases) with the existing magnetic signal at the location where the power is sent to, e.g., at the location where the power converter 143 of the power pod is located. Alternatively, the cell-side control unit 126 may communicate with the pod-side control unit 144 to receive information regarding frequency and phase of the magnetic field in the pod-side magnetic core 142C and the cell-side magnetic cores 142D passing though itself (its own coils in its cell side power converter) or those passing through the other power cells 12 in the power pod, and use the information to control its own power converter 125 to achieve synchronization.

The power converter 143 of the power pod 14 functions to direct power between power cells 12 and the system power bus 31 of the power supply system 1. The power converter 143 in the power pod uses the coil wound around the pod-side magnetic core 142C of the power pod to drain or pour power from or to power cells. The AC magnetic signal for draining power from power cells and the AC magnetic signal for transferring power to power cells can have different frequencies so that bidirectional power flows between power cells and the power pod and between different power cells within the power pod can happen at the same time without any interference between each other. The control unit 144 in the power pod 14 controls the operations in the power pod and communicates with both the power cells 12 held in the power pod and the system controller 32. The various scenarios of power flows may include, for example: All the power cells send power to the power pod; All the power cells drain power from the power pod to recharge the cells; One power cell drains power from the power pod, and the other power cell send power to the power pod (The two operations run at the same time but use different frequency components of the magnetic signals); One power cell drains power from the other power cells, while the other power cell also send power to the power pod (The two operations use the same frequency component of the magnetic signals); etc. These are just some of the examples of the operation scenarios. There are unlimited number of additional combinations depending on the real use cases.

In addition to controlling the power transfer directions of the power cells, the control unit 144 in the power pod 14 also perform one or more of the following functions, without limitation.

The control unit 144 reads information from each power cell 12 and writes information to each power cell. The information can include but is not limited to: battery cell status in a power cell, power cell identification or serial number, power cell model number, charge and discharge status of a power cell, power cell exchange and charging station or pump information, power cell charge or discharge lock or unlock status, power cell permanent disable, the signal frequencies for power transfer, the signal frequencies for communications of different purposes, etc. The control unit 144 performs power pod and power pod protection related control function, load balance among power cells in the power pod, and power pod status updates to the system power bus.

In summary, to solve the problems described earlier and to further extend the usage flexibility of the power system based on power cells, a new design of power cell and the corresponding power pods are described herein. In the new design, the magnetic core is not part of any power cell. All the magnetic core parts are held in a power pod. In addition, an auxiliary communication port is added to each power cell. In this way, not only the problems can be solved, it also enables a new architecture of electric vehicle powertrain or drivetrain of which the efficiency may be further improved.

The in-vehicle power supply system 1 also includes a system controller 32 (see FIG. 1). It can communicate with each power pod 14 in the power cell array 10 directly (e.g. by electrical signals) and with each power cell 12 in the power cell array through the corresponding power pod control unit 144. In this way, information can be exchanged between the power system controller 32 and each power cell 12. Load balance among power pods or even among power cells within the power cell array can be achieved by the system controller. The system controller 32 also communicates with and controls the mechanical transport system 20.

In a vehicle, the array of power cells and power pods form an in-vehicle power supply network. Based on needs, the operation and configuration of the network can be quite flexible. This can help better fit the needs and reduce the cost to the user and improve the performance of the system. The system controller 32 can use AI (artificial intelligence) and machine learning to optimize the performance of the power cell network inside a vehicle.

The in-vehicle power supply system 1 can also be compatible with existing charging station for existing electric cars. It can use the existing charging station to charge the power cells in the power cell array just like for the existing electric cars.

Now reference is made to FIGS. 7A-11, which illustrate electric motors incorporating power pods according to other embodiments of the present invention. In existing electric vehicles, the electric energy or power is generated by batteries or battery arrays and transmitted to a motor driver system, and then converted to the electric energy or power with specific voltage or current that fit the needs of driving the specific electric motor or motors in the vehicle. In each electric motor, the electric energy or power is then converted to magnetic energy or power which is in turn converted to mechanical energy or power so that the motor can make the vehicle move. In an electric vehicle using the power system described in the '416 application, which is based on power cells and power pods, the vehicle gains a lot of benefits such as fast energy recharging, but may not have much improvement in the aspect of efficiency. In FIGS. 7A-11, new designs of the motor and the powertrain of an electric vehicle are described. In these electric motors, instead of getting electricity from either a battery array or power pods and power cells, the power cells 12 described in FIGS. 2, 3A and 3B are directly loaded into an electric motor. The stator of the motor perform similar functions as the magnetic core 142 of the power pod in the earlier described embodiments. The magnetic fields that cause the electric motor to move or rotate are directly generated by the power cells 12 loaded in the motor. The power cells 12 will be part of the electric motor when the electric motor is in use. The power cells 12 loaded in an electric motor can be replaced in a similar way that the power cells in a power pod are replaced. This will help to further improve the powertrain efficiency of an electric vehicle in terms of energy or power type conversion times in the whole powertrain and power supply system. In addition, due to reduced number of parts, the weight of an electric vehicle can be reduced and the powertrain of the vehicle can be made more compact which again helps to improve the overall efficiency of the vehicle. Furthermore, the electric motors according to these embodiments enable additional new opportunities.

1. By using such electric motors, the performance of an electric vehicle will depend on the design of the motor and the way of controlling the power cells loaded in the motor. In this way, there are plenty of room for electric vehicle manufacturer to make their designs unique.

2. By employing machine learning and AI, even cars with the same hardware design can performance differently after certain time of period of using by specific users, depending on the users' driving habits and the history of the vehicle. This will make the user experience better. This is something existing vehicles, even existing electric vehicles, cannot achieve.

Figures 7A, 7B, 8A, 8B:
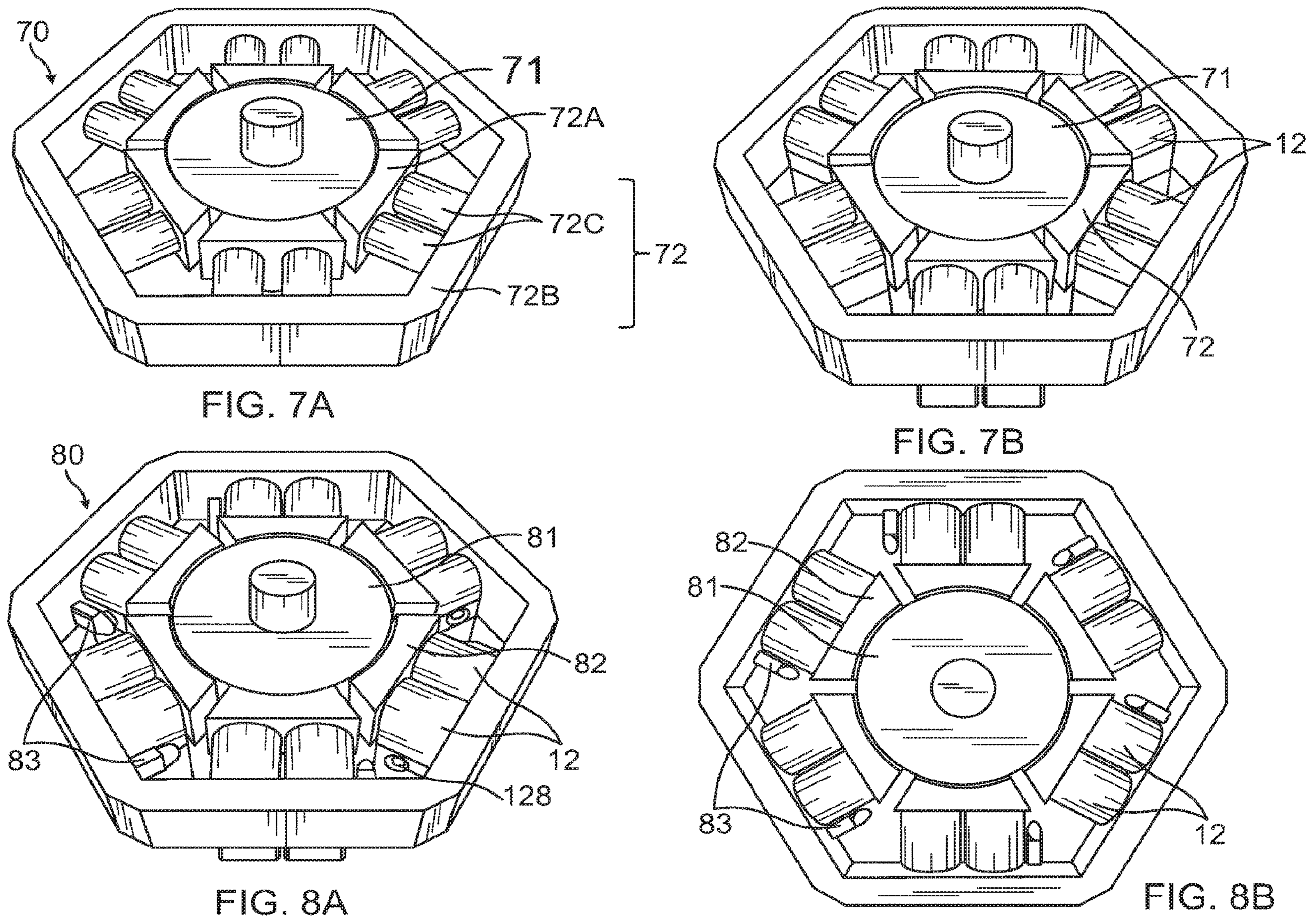

FIGS. 7A-7B illustrate an electric motor according to an embodiment of the present invention. FIG. 7A is a perspective view showing the electric motor 70 without any power cell. The structure of the motor 70 is similar to existing electric motor design in that it includes a rotor 71 and a stator 72 disposed around the rotor. However, different from conventional electric motors, there is no other coils in the stator 72 for driving the rotor (but there may be coils in the motor side controller for communication purposes as described below), and the stator is modified so that power cells can be loaded into it and the coils of the power cells function as the coils of the stator. FIG. 7B is a perspective view showing the motor 70 with power cells 12 loaded in it.

As shown in FIG. 7A, the magnetic core of the stator 72, which is made of a magnetic material with a high magnetic permeability, such as ferromagnetic or ferrimagnetic materials, includes one or more first end pieces 72A disposed around the rotor 71, one or more second end pieces 72B spaced apart in the radial direction from the first end pieces 72A, and a plurality of posts 72C each extending radially between and in contact with a first end piece and a corresponding second end piece. The one or more first end pieces 72A collectively surrounds the rotor 71. In the illustrated example, the stator 72 includes multiple first end pieces 72A and one second end piece 72B that correspond to all of the first end pieces. Alternatively, the stator may include multiple separate second end pieces 72B each corresponding to one first end piece 72A, or other numbers of second end pieces. The power cells 12 are the same as or similar to the ones shown in FIGS. 3A and 3B, where the posts 72C of the stator pass through the through holes 127 of the power cells.

The rotor 71 may have a conventional structure including a magnetic core. The motor 70 further includes a motor side controller with its coils (not shown in FIGS. 7A and 7B). The motor side controller is configured to be communicatively coupled to the power cells 12 via the stator's magnetic core so that the control signals and data can be transferred bidirectionally between the motor side controller and the power cells. In this way all the power cells can be controlled by the motor side controller to operate the motor.

Typically, the magnetic materials used to make the stator of an electric motor may not be able to be operated at a frequency higher than a few hundreds of kilohertz. As mentioned earlier, this may cause insufficient bandwidth for communications with a power cell through the same magnetic circuit which is used for energy or power transfer from or to the power cell. Even if the bandwidth is adequate, the interference within the motor during the operation of the motor may still cause communication issues with a power cell when the communication function shares the same magnetic circuit with the part in the system which is used to transfer energy or power. To solve this issue, as described earlier, an alternative power cell structure utilizes an auxiliary communication port, as shown in FIG. 3B.

FIGS. 8A-8H illustrate an alternative electric motor 80 according to an embodiment of the present invention that cooperates with power cells 12 equipped with auxiliary communication ports 128. The rotor 81 and stator 82 of the electric motor 80 are similar to those in the embodiment of FIG. 7A-7B, but one major difference between the motors shown in FIGS. 7A-7B and FIGS. 8A-8H is that in the motor shown in FIGS. 8A-8H, additional communication towers 83 are provided so that the motor side controller can communicate with all the power cells 12 in the motor. The control signals and/or data can be transferred between the power cells 12 and the motor through magnetic field in the stator core, or via the auxiliary communication port and the nearby communication tower on the motor side using a magnetic field (but the direction of this magnetic field is preferably perpendicular to the one used to driving the rotor as described above), or using electromagnetic waves e.g., inferred light. Power cells 12 within the motor can also communicate with each other through their auxiliary communication ports. If there is no motor side communication tower 83 close to a particular power cell, but there is another power cell nearby that can communicate with the motor side controller, this power cell can conduct the communication with the motor side controller through the nearby power cell.

Figure 11:
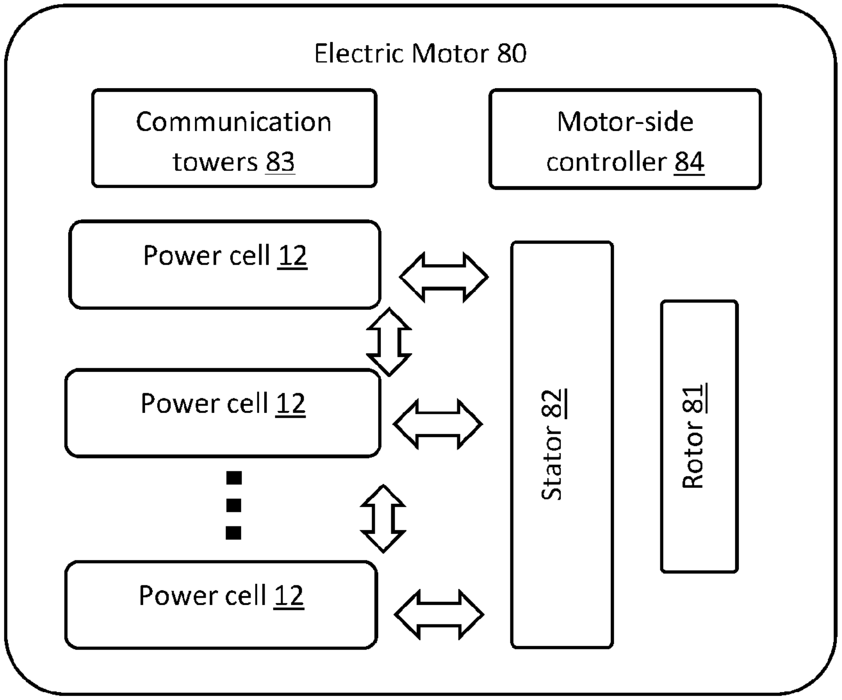
FIG. 11 is a schematic block diagram of an electric motor loaded with power cells according to embodiments of the present invention.

FIG. 11 is a block diagram that schematically illustrates components of an electric motor 80 directly loaded with power cells, showing the communication towers 83 and the motor side controller 84 in addition to the rotor 81 and stator 82. The motor side controller 84 is configured to communicate control signals and data with the power cells 12, so that all the power cells can be controlled by the motor side controller to operate the motor. Note that the motor 70 shown in FIGS. 7A-7B may also be represented by this block diagram except that there will be no communication towers.

Figures 8C, 8D, 8E:
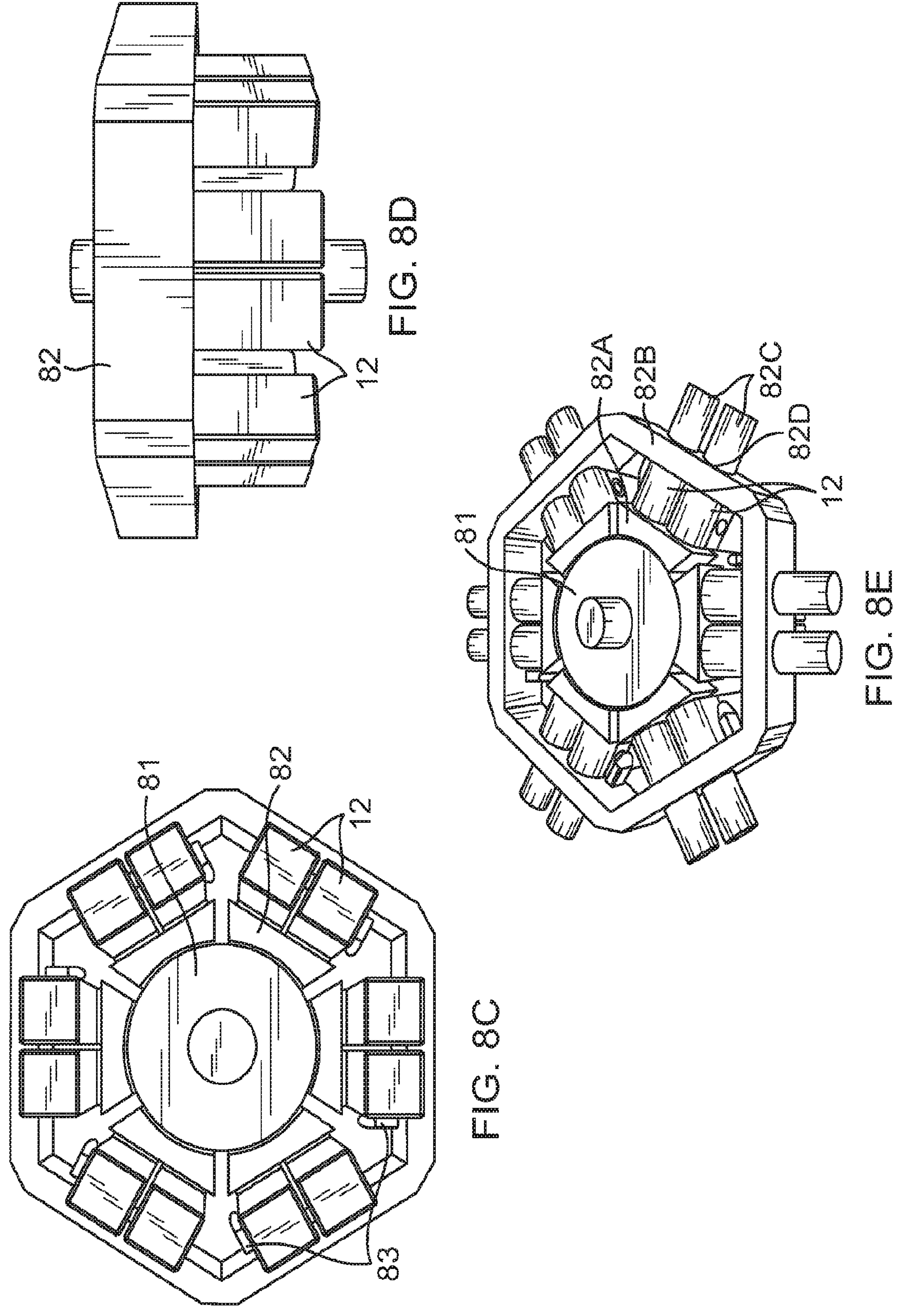

FIGS. 8B-8D provide the top view, bottom view, and side view of the motor 80 of FIG. 8A, respectively.

In order to make it possible to replace the power cells in a motor, certain part of the stator of the motor 70 and 80 in FIGS. 7A and 8A can be made movable. Using motor 80 as an example, as shown in FIG. 8E, the movable parts of the stator are the posts 82C (similar to posts 72C shown in FIG. 7A). These posts 82C are moveable in a radial direction outwardly, through corresponding through holes 82D on the second end piece 82B (open state), so that they are moved out of the way of the power cells so that the power cells can replaced. The power cells which have been depleted or need to be replaced due to any reason then can be taken out from the motor, and the replacement power cells can then be loaded back into the motor. After power cell replacement, the posts 82C are moved back in a radial direction until they contact the first end piece 82A of the stator (closed state). Note that in this embodiment, the posts 82C fill the through holes 82D in the closed state.

Figure 8H:
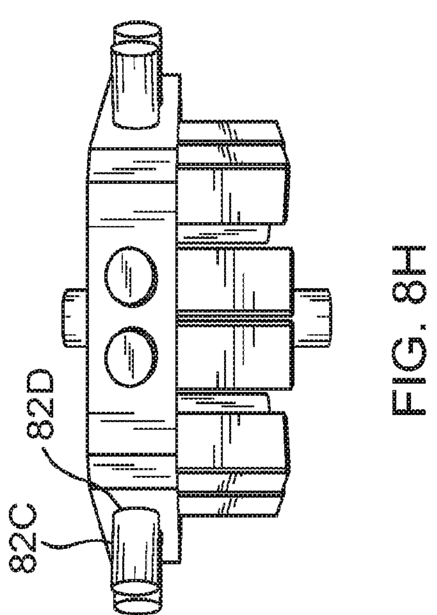
Figure 8F:
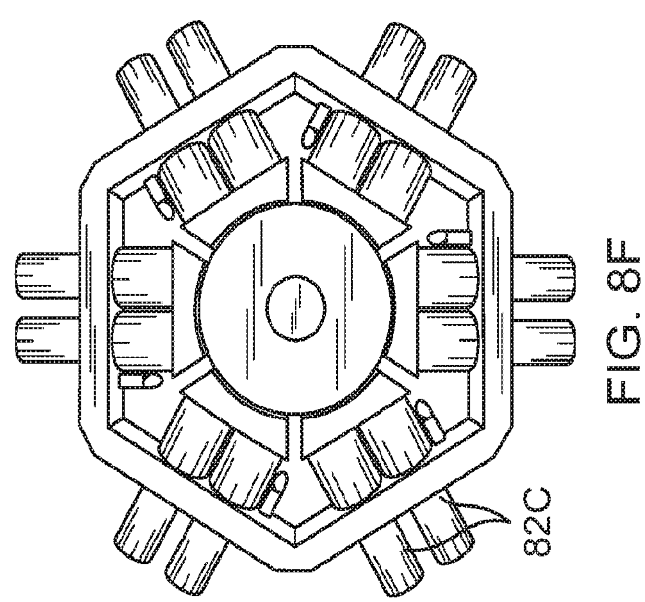
Figure 8G:
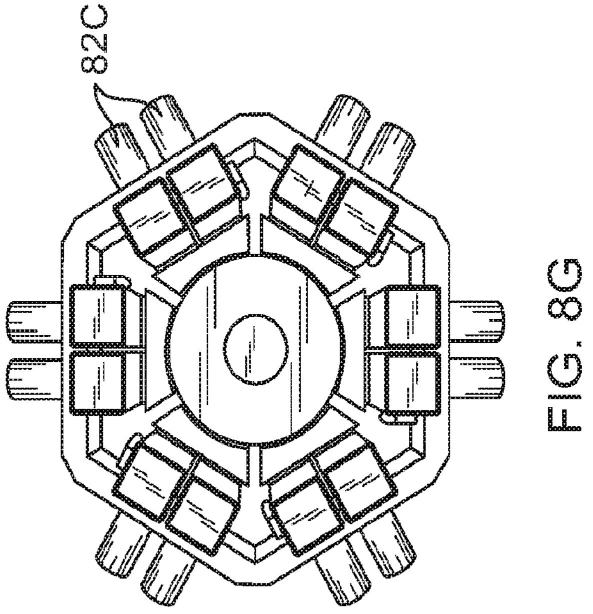
Figures 9A, 9B, 9C:
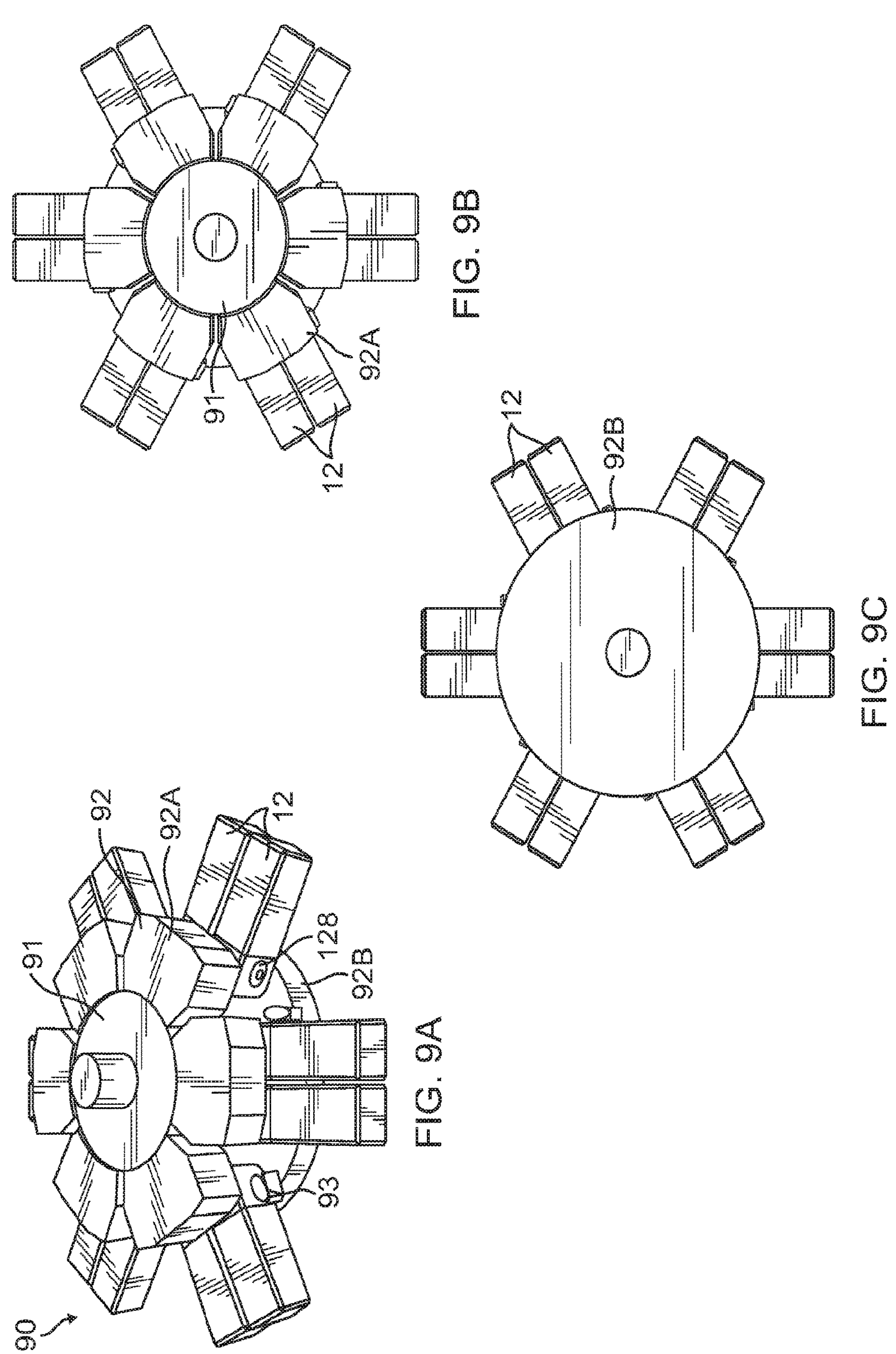
Figure 9H:
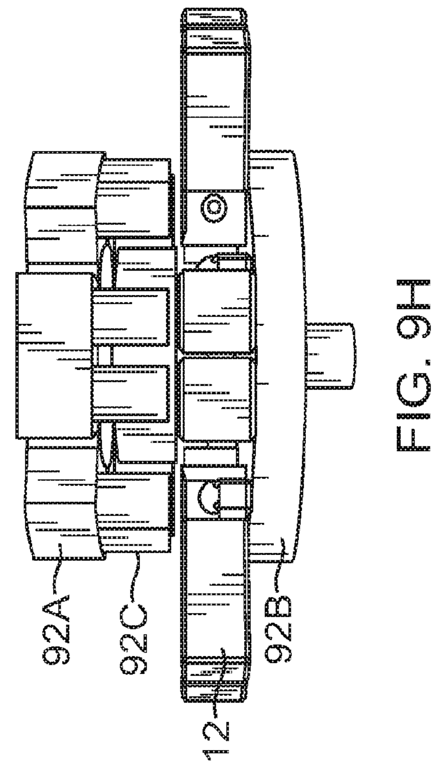
Figure 9G:
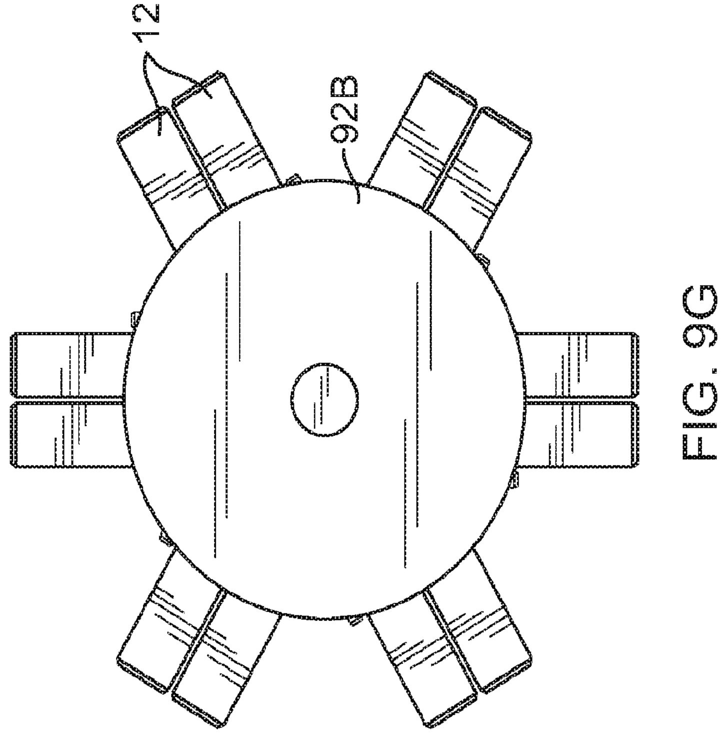
Figures 9D, 9E, 9F:
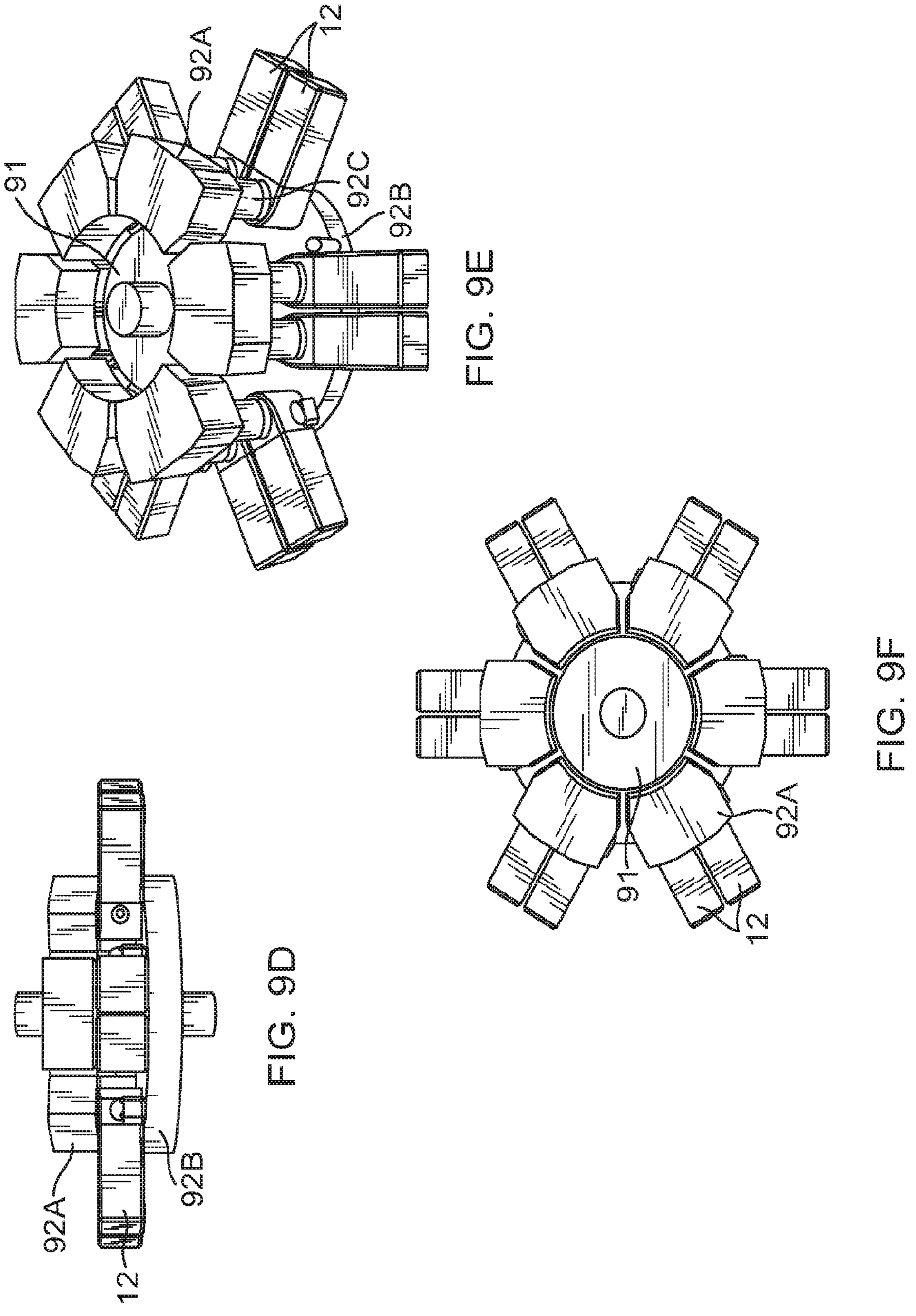

The top view, bottom view, and side view of the motor 80 in the open state are presented in FIGS. 8F-8H, respectively. In FIGS. 8A-8H, the additional mechanical parts and the actuators which achieve the movements of the movable parts of the motor stator (which are a part of the mechanical transport system 20) are not shown, but any suitable mechanical structures may be used.

In an alternative embodiment (not shown in the drawings), the moveable parts of the stator are the second end piece 82B, which may be moved in the axial direction away from the posts 82C, so that the power cells 12 can be moved in a radial direction off of the posts. Note that in this alternative embodiment, the second end pieces 82B do not have through holes for the posts to pass through. In another alternative embodiment, the second end piece 82B are formed of separate pieces, which are moveable in the radial direction away from the first end pieces 82A. The poses 82C are attached to the corresponding second end piece 82B and are moved out of the way of the power cells 12. In yet another alternative embodiment, the second end piece 82B are formed of separate pieces, which are moveable in the radial direction away from the first end pieces 82A; the posts 82C remain attached to the first end pieces 82A, and the power cells are moved in the radial direction off of the posts.

FIGS. 9A-9H illustrate an example of an alternative arrangement of power cells within an electric motor. FIGS. 9A-9D are perspective, top, bottom and side views showing the power cell arrangements in the electric motor 90 in the closed state. FIGS. 9E-9H are perspective, top, bottom and side views showing the open state where the movable parts of the stator of the motor are moved so that the power cells in the motor can be replaced.

As shown in FIGS. 9A-9H, the motor 90 includes a rotor 91 and a stator 92. The magnetic core of the stator 92 includes one or more first end pieces 92A disposed around the rotor 91, one or more second end pieces 92B spaced apart in the axial direction from the first end pieces 92A, and a plurality of posts 92C each extending in the axial direction between and in contact with a first end piece and a corresponding second end piece. The one or more first end pieces 92A collectively surrounds the rotor 91. In the illustrated example, the stator 92 includes multiple first end pieces 92A and one second end piece 92B that correspond to all of the first end pieces. Alternatively, the stator may include multiple separate second end pieces 92B each corresponding to one first end piece 92A. Other numbers of second end pieces 92B may also be used. The power cells 12 are the same as or similar to the ones shown in FIGS. 3A and 3B, where the posts 92C of the stator pass through the through holes 127 of the power cells. Similar to the motor 80, the motor 90 may include a plurality of communication towers 93, located on the second end piece 92B. The power cells 12 may be equipped with auxiliary communication ports 128 to communicate with the communication towers 93.

To replace the power cells 12, as shown in FIGS. 9E-9H, the first end pieces 92A, along with the posts 92C that are attached to the first end pieces, are moved in the axial direction away from the second end piece 92B, so that the posts 92C are moved out of the way of the power cells 12. In an alternative embodiment (not shown in the drawings), the first end pieces 92A (or the second end piece 92B) are moved in the axial direction to separate from the posts 92C, while the posts and the second end piece (or the first end pieces) remain in place; the power cells 12 are moved in the axial direction off of the posts. In another alternative embodiment, the first and second end pieces 92A and 92B remain in place, and the posts 92C are moved in the axial direction through corresponding through holes in the first or second end pieces to move out of the way of the power cells.

Although in the examples shown in FIGS. 7A-9H, only one layer of power cells are provided in a motor, more power cells arranged in multiple layers can be provided in a motor. Two additional examples electric motors with more power cells arranged in multiple layers are presented in FIGS. 10A-10D. The electric motor 90' shown in FIGS. 10A (closed state) and 10B (open state) is similar to that shown in FIGS. 9A-9H except that the posts 92C' are longer and two side-by-side power cells may be provided around each post.

Figures 10A, 10B:
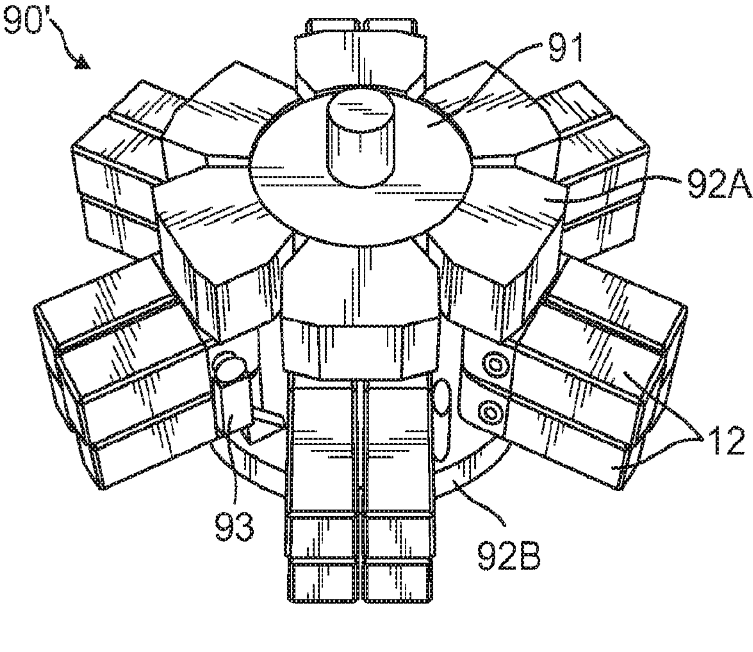
Figure 10C:
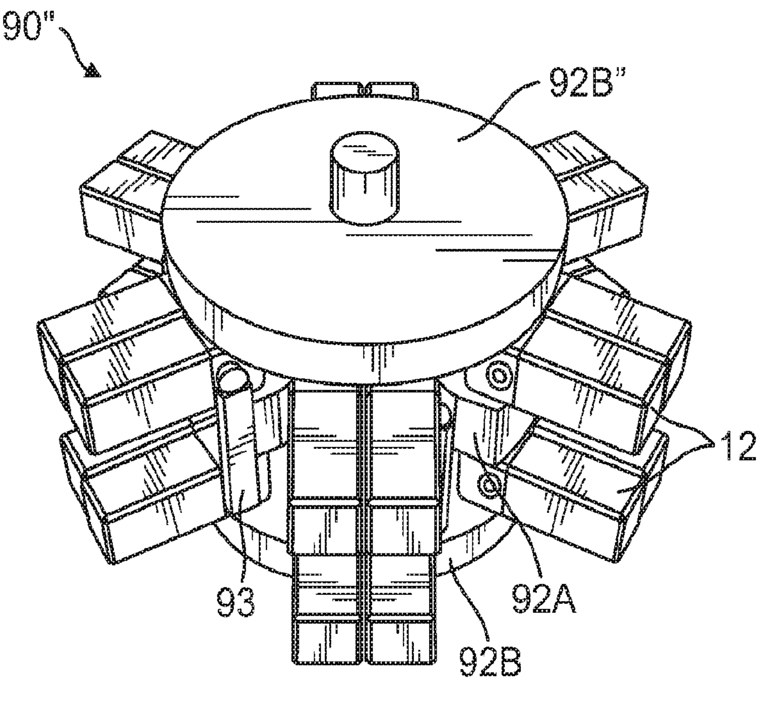
Figure 10D:
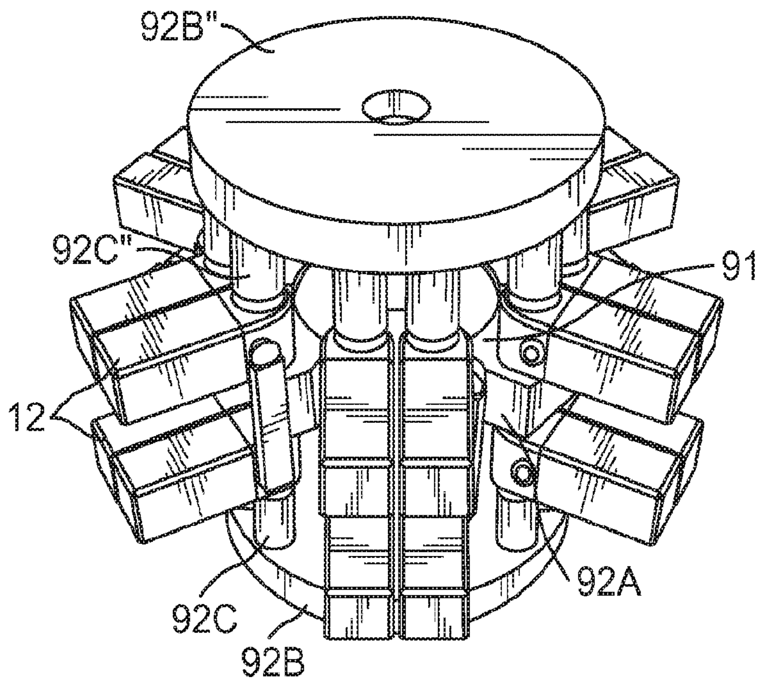

In the electric motor 90" shown in FIGS. 10C (closed state) and 10D (open state), the stator includes one first end piece 92A that surrounds the rotor, and two second end pieces 92B and 92B" respectively located below and above the first end piece 92A. One set of posts 92C are located between and in contact with the first end piece 92A and one second end piece 92B; another set of posts 92C" are located between and in contact with the first end piece 92A and the other second end piece 92B". One power cell 12 may be provided around each post. The open state of the stator may be achieved by moving the two second end pieces 92B, 92B" together with the corresponding posts 92C and 92C" in the axial direction away from the first end piece 92A. Other ways of achieving the open state may be used, similar to those described above for the motor 90.

From FIGS. 7A-10D and the descriptions above, it can be seen that there may be many other ways to spatially arrange the various components of the stator (the magnetic core) and mechanically divide these components into two or more parts in order to facilitate exchange of power cells. The invention is not limited to any particular spatial and mechanical arrangements. More generally, the stator (magnetic core) of the motor includes multiple pieces of magnetic materials, including a plurality of posts each configured to accommodate a power cell around it (i.e. passing through the through hole of the power cell), where at least some of the multiple pieces are moveable relative some other pieces so that the stator is reconfigurable between a closed state (for motor operation) and an open state (for power cell exchange). In the closed state, the multiple pieces mechanically contact each other to form closed magnetic circuits without air gap. In the open state, some pieces normally in contact with each other are mechanically separated, so that power cells can be moved into or away from their intended positions around the posts. In particular, for example, one or both ends of each post is separated from the other pieces in the open state.

In addition to the examples shown in FIGS. 7A-10D, there may be other ways to enable replacements of power cells in the electric motor. First, liquid with good magnetic conductivity can be used to form parts of the stator of the electric motor. In this way, the replacement of power cell become easier since there will be no solid moving parts in the stator of the motor. The motor can be designed in a more compact way. In addition, the air gap may be better removed so that the reluctance of the magnetic circuit of the motor can be lower which means better motor performance and higher efficiency. Further, the motor can have better thermal management which is at least partially based on liquid with good magnetic conductivity. The reason is that, the specific liquid magnetic conductor material can not only be used as thermal conductor beside magnetic conductor, it can also be moved from one place in the motor to another place outside the motor. This process can help quickly dissipate the heat generated by the motor during operation. The liquid can be thin or can be quick thick like certain kind of gel. Further, certain kind of material which can be easily changed between solid phase and liquid phase and is a good magnetic conductor can also be used. During the normal operation, they are in the solid phase and form parts of the stator of the motor to reduce the reluctance of the magnetic circuit. When the power cells in the motor need to be replaced, those parts formed by the material can be changed from solid phase to liquid phase and then be temporary removed from the motor stator so that the replacement of power cells can be conducted. After the replacement, the liquid can be put back in the right place and changed to solid phase again to form the parts in the stator of the motor again to ensure the normal operation of the motor.

Base on the way of how to control the power cells to work together in combination with the rotor design, the electric motor described above can be induction motor, switched reluctance motor, or synchronized reluctance motor, etc. The magnetic fields in the motor from the stator can change its direction in a stepped manner or in a manner of continuous rotation depends on the way how the power cells are controlled to generate the magnetic fields. It may be a hybrid type motor or a motor that can operate in different modes. Those of ordinary skill in the art of electric motor will be able to implement the motor side controller to realize the different types of motors and different operating modes. Moreover, as mentioned earlier, the motor side controller may be programmed to employ machine learning and AI so that the motor control algorithm can evolve over time to achieve desired performance characteristics. The rotor may be the same or different in all the motors described above. Although in the examples shown in FIGS. 7A-10D, only 6 poles in the stator of the motor are shown, the motor is not so limited and can have any other number of poles in both the stator and the rotor. In addition, depending on the way of how the power cells are controlled, the number of poles in the stator may be different from the number of power cells in the motor or the numbers of power cell groups in the motor. The number of poles may even be changeable based on the needs in a specific motor by changing the way the power cells are controlled.

To increase the power and torque of the motor, the illustrated embodiments of the motors in FIGS. 7A-10D can be treated as fundamental building blocks of a system and more of these motors can be connected mechanically, and their controller can be coupled together electrically so that a more powerful powertrain can be formed.

It should also be noted that the electric motors in the embodiments of FIGS. 7A-11 do not require the power cells 12 to be free of any integrated magnetic core. What is important for these embodiments is that the power cells are directly loaded into the electric motor's stator and the magnetic fields that cause the electric motor to move are directly generated by the power cells loaded in the motor; or to put it another way, the coils of the power cells function as the coils of the motor stator. Thus, in alternative embodiments, the power cells may have cell-side magnetic cores integrated in them, and the stator of the motor provides the other parts of the magnetic core that accommodate the magnetic cores of the power cell to form closed loops. For example, in the embodiments of FIGS. 7A-10D, the posts 72C/82C/92C/92C'/92C" may be changed to integral parts of the power cells, or the power cells with integrated magnetic cores may have a structure similar to that described in the '416 application.

Figure 12:
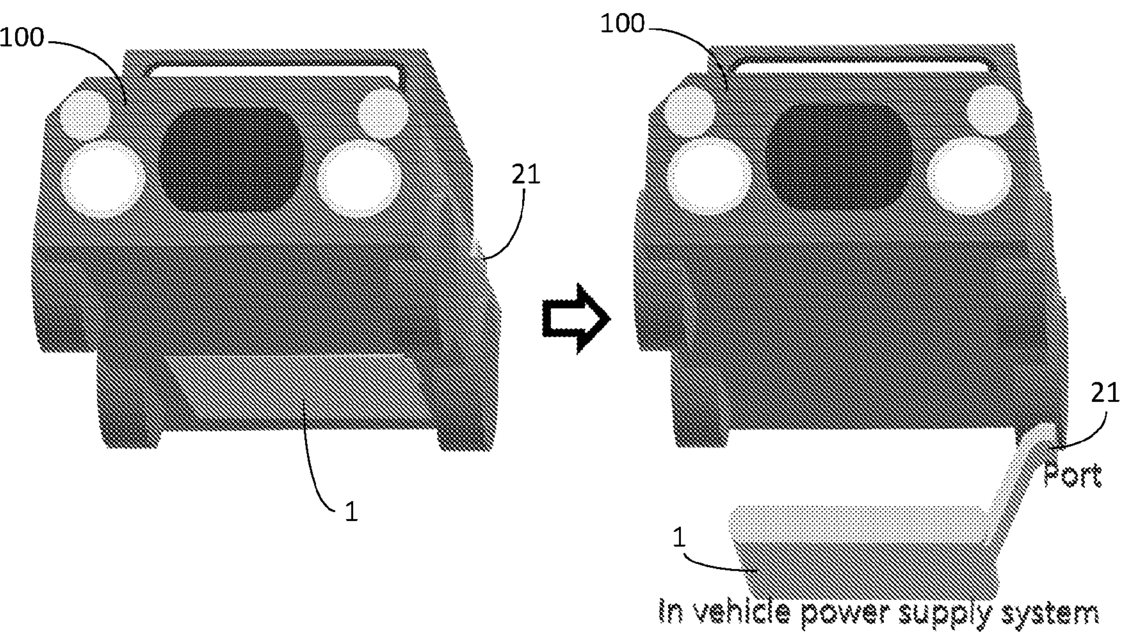
FIG. 12 schematically illustrates an exemplary location of an in-vehicle power supply system in a vehicle according to embodiments of the present invention.
Figure 13:
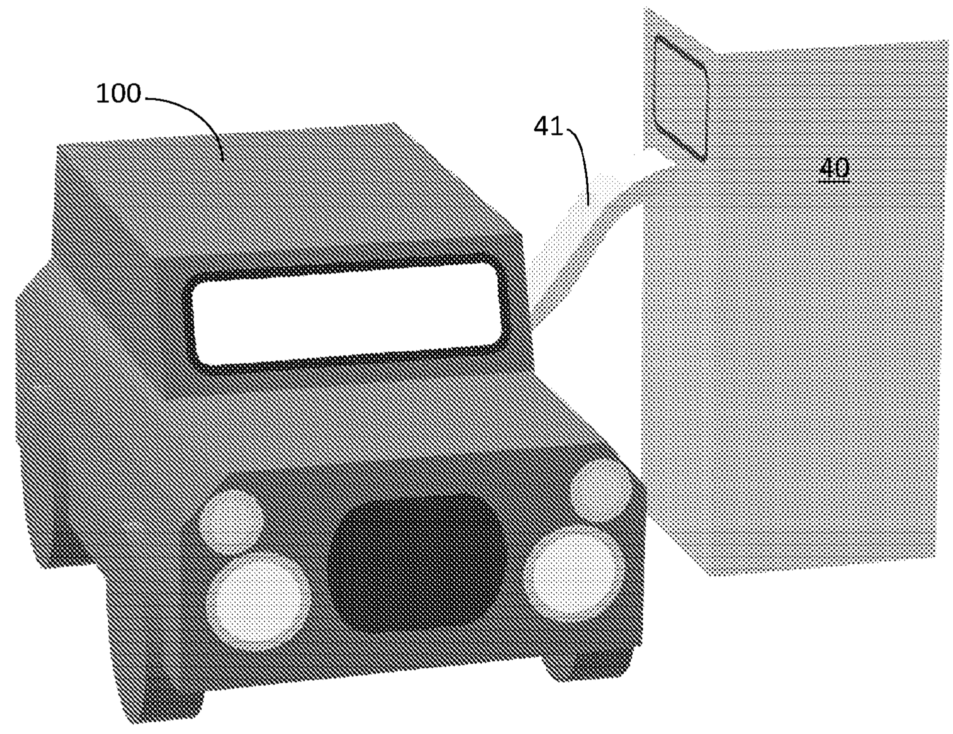
FIG. 13 schematically illustrates a scenario of power cell exchange between a vehicle and a pump at a power cell exchange and charging station according to embodiments of the present invention.

FIG. 12 shows an example about where and how a power supply system 1 can be installed in a vehicle 100. FIG. 13 illustrated the scenario when a vehicle 100 is parked in front of a power cell exchange and charging pump 40 for power cell exchange. As shown in FIG. 12, the in-vehicle power supply system 1 is enclosed in an enclosure which may be located at the base of the vehicle body, with the port 21 of the enclosure open on a side of the vehicle body for convenient power cell exchange. The right hand side of FIG. 12 shows an unassembled view of the power supply system 1 and the vehicle 100. The power cell exchange and charging pump 40 may have an arm or conduit 41 that can connect to or engage with the port 21 of the in-vehicle power supply system 1 for power cell exchange.

Figure 14:
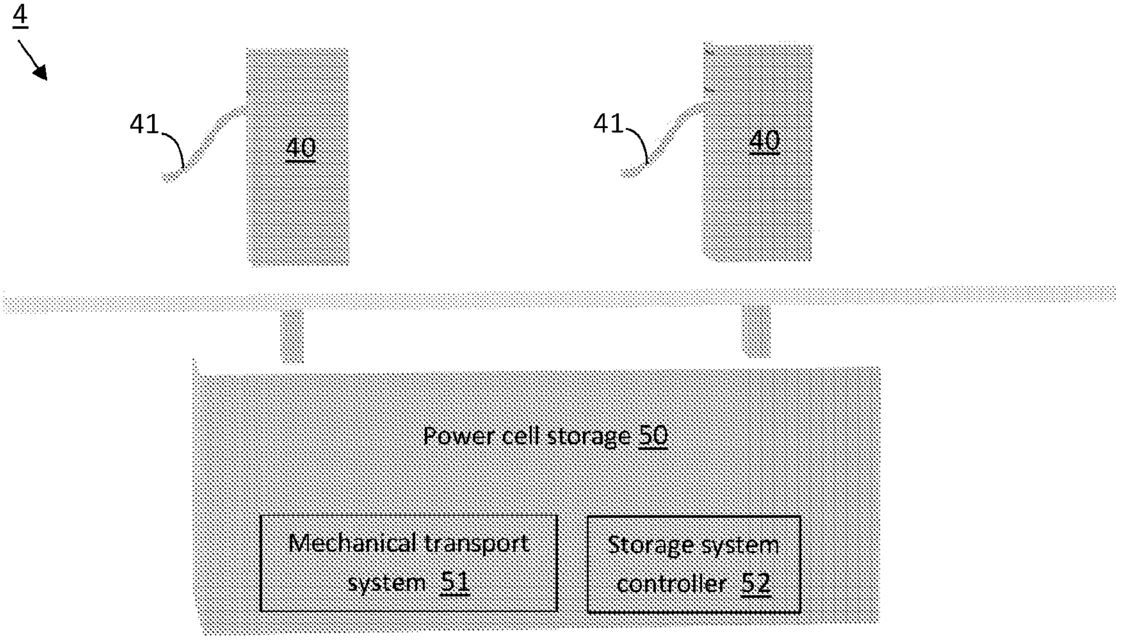
FIG. 14 schematically illustrates the structure of a power cell exchange and charging station according to embodiments of the present invention.

FIG. 14 presents a schematic diagram of the structure of a power cell exchange and charging station. The power cell exchange and charging station 4 has a plurality of power cell exchange pumps 40 connected to a power cell storage 50 which may be located underground. The power cell exchange pump 40 can take depleted power cells from a vehicle and put them into the underground power cell storage 50 for storage and recharge. The power cell exchange pump can also load charged power cells to the vehicle which needs refreshed power cells. Suitable mechanical transport systems 51 are provided in the power cell exchange and charging pump 40 and the power cell storage 50 to accomplished transporting of power cells and loading and unloading of power cells into and from the in-vehicle power supply system 1. The mechanical transport systems 51 may employ similar components described earlier in connection with the mechanical transport system 20. Those of ordinary skill in the relevant art can implement a suitable mechanical transport structure without undue experimentation.

The structure of the underground power cell storage 50 may be similar to the in-vehicle power supply system 1. For example, power pods are provided to hold power cells. The different is the capacity of the power cell array. The power cell array in an underground power cell storage 50 is much larger than that of an in-vehicle power supply system, and can hold a large number of power cells. The power cell storage 50 further includes a storage system controller 52 which is connected to the power pods within the storage 50 and controls the charging and discharging of the power cells, as well as the operation of the mechanical transport systems 51.

The power cell exchange station 4 has a local energy harvest function. The exchange station can charge the depleted power cells from electric vehicles using power from the power grid, from solar cells, or other local electricity generators. Since it can charge those collected depleted power cells at a relatively low charging speed during nighttime instead of or in addition to during the daytime, it greatly reduces the pressure added by the ever increasing conventional charging stations for conventional electric cars during the daytime, especially those conventional super charging stations which must charge the electric vehicles at any time demanded by the vehicle users within a relatively short period of time. A relatively low charging speed also helps to extend the life span of the battery cells in the power cells. Normally the higher the speed of charging, the shorter the life span of a battery cell.

In addition, in the vehicle power supply system according to embodiments of the present invention, power cells can be arranged to provide power to the vehicle in a manner so that some but not all of the power cells in the power cell array in the vehicle provide power at certain moment. In this way, only after certain power cells are depleted, then other power cells in the same power cell array will be used to provide power to the vehicle. In this way, at the power cell exchange and charging station, only power cells that have been depleted will be exchanged. These power cells will be recharged at the power cell exchange and charging station.

Another scenario is that, the partially discharged power cells can be also collected at the exchange and charging station. Then the energy that remains in the power cells will be used to charge other power cells in the storage and charging structure or to provide power to the power grid or the electric vehicle that are charging at the station, then they will be recharged after they are depleted. In this way, the life span of the battery in the power cell can also be extended.

The power cell exchange and charging station can also act as a local energy storage and provide power supply under certain conditions to the surrounding areas. For example, if there is an unexpected power loss in certain area due to malfunction or problems in the power grid, the power cell exchange and charging station can provide emergency power supply to its surrounding areas. The station can also help to mitigate issues during the daytime due to the peak load within certain part of a power grid. For example, the power cell exchange and charging station can reserve part of the power cells to supply power during the daytime and recharge those cells during nighttime. This is helpful to maintain the local electrical power distribution network to run in a healthy way. On the other hand, the existing super charging stations, which must charge vehicles during daytime when demanded by vehicle users, put extra pressure on the electricity power distribution network during daytime. In addition, if there is a known or expected power loss or failure within certain areas, the power cell exchange and charging station can charge part of or all the power cell it stores within a short period of time at high speed for later backup power use. It can either charge power cells by draining power from power grid or pour power to the power grid from power cells it holds under certain condition or based on requirements. This makes power supply within an area more stable during peak load. This also helps to make the power delivery grid healthier and reduce blackout during the peak load. This also reduces the possibility of power grid induced fire due to overloading and helps improve public safety within the nearby area of the power cell exchange station.

By using AI to plan and organize at the system level and autonomous driving in each vehicle, vehicles can be directed to the locations where power is needed under certain conditions with or without the users' or owners' permissions. This can be implemented so that a dynamic moving backup power network or system can be built. The users or owners of the vehicle can select whether or not their vehicles belong to certain subset of this dynamic moving backup power network. If they choose to let their vehicle join this network, there will be subsides to the power cell refresh/recharging to them and they can have higher priorities to get recharged power cell when the power cell supplies are limited. In addition, they may have the priority to get backup power from the moving backup power network when they need backup power in certain cases e.g., power failure in certain area.

The operation of the whole power system according to embodiments of the present invention can also be different from the current electric car eco system. This new system is still compatible with the existing system. Each electric vehicle can still be charged at the existing charging station as mentioned previously. The difference is that, in the new system, each electric vehicle is sold without power cells. These will greatly lower the cost of the vehicle to the end user. The power cells are only leased to each end user. Each end user can lease certain amount of power cells which may depend on their lease contract. This new system can be used not only in electric cars but also other electric vehicles e.g., electric bicycles, electric airplanes, electric boats and ships, etc.

Since all the depleted power cells will be collected by the exchange and charging stations, and all the fundamental building blocks of the power cells are the same, it also makes the recycling of the battery cells in the power cell much easier and reduce pollution during battery cell recycling.

The range and/or performance of the electric vehicles can be improved by replacing the power cells with newer or better battery cells based on better technology. This further lowers the cost of the end users and gives the end users more flexibility.

The in-vehicle power supply system according to embodiments of the present invention also improves safety. A bare battery can release its stored energy easily by any conductive loop between its positive and negative contacts. This makes them more dangerous. Power cells according to embodiments of the present invention, on the other hand, do not have this disadvantage. A power cell needs to be turned on by specified signals or access code provided from outside. It can also have load sensing capability. The combination of these two factors makes it much safer than traditional batteries.

In the situation when a vehicle is connected to a specially designed charger at a charging station or at home of the user instead of a power cell exchange pump, the vehicle is not only able to get power from the charger to charge the batteries it carries, it can also supply power. In this way the energy can flow in both directions between the connected vehicle and the charger, whenever a vehicle is connected to a charger no matter at a charging station or at home of the user. The connected vehicles in an area can form a power supply network and provide power storage function and supply power to the power grid or home if needed. AI and machine learning can be used to optimize the performance of the collaboration of multiple vehicles and charging stations when specific power flow pattern within the power grid of a specific area or at home is needed.

Various components and modules of the system described above, such as the cell-side power converter 125, cell-side control unit 126, pod-side power converter 143, pod-side control unit 144, power supply system controller 32, storage system controller 52, etc. may be implemented by electrical circuitry including logic circuits, and/or processors which execute computer executable program code stored in computer readable non-volatile memories.

It will be apparent to those skilled in the art that various modification and variations can be made in the in-vehicle power supply system, the power cell exchange and charging station, as well as related methods of the present invention without departing from the spirit or scope of the invention. Thus, it is intended that the present invention cover modifications and variations that come within the scope of the appended claims and their equivalents.

What is claimed is:

1. A power supply system comprising:

a plurality of power cells, each power cell having one or more battery cells and a cell-side power converter, the power cell defining a through hole, the cell-side power converter including a coil wound around the through hole;

at least one power pod, each power pod having a pod-side power converter which includes a magnetic core and a coil wound around a part of the magnetic core, the magnetic core including a plurality of posts each configured to pass through the though hole of one of the power cells, wherein the magnetic core is divided into a plurality of pieces, wherein a first subset of the plurality of pieces is moveable relative to a second subset of the pieces to reconfigure the magnetic core between a closed state and an open state, wherein in the closed state, the plurality of pieces mechanically contact each other to form closed magnetic circuits without air gap, and in the open state, some pieces among the first and second subsets that mechanically contact each other in the closed state are mechanically separated, wherein the open state is configured to allow each power cell to be moved into a position around a post or away from the post;

wherein each power cell is held by one of the at least one power pod and is configured to form magnetic field coupling with the power pod to transfer power bidirectionally between the power cell and the power pod;

a system power bus electrically coupled to each power pod; and a mechanical transport system configured to mechanically move the first subset of the plurality of pieces of the magnetic core and to mechanically move the power cells relative to the at least one power pod.

2. The power supply system of claim 1, wherein the magnetic core of each power pod further includes: a first end member, a second end member, and a pod-side post, wherein in the closed state, the first end member and the second end member face each other with the pod-side post and the plurality of posts disposed between and in contact with the first and second end members, and wherein in the open state, the second end member is separated from the pod-side post and the plurality of posts.

3. The power supply system of claim 1, wherein each power cell further includes a cell-side control unit coupled to the cell-side power converter and configured to control the cell-side power converter, and wherein each power pod further includes a pod-side control unit coupled to the pod-side power converter and configured to control the pod-side power converter.

4. The power supply system of claim 3, wherein either: the cell-side control unit of each power cell is configured to measure a frequency and a phase of a magnetic field in the post of the magnetic core that passes through the through hole of the power cell and to control the cell-side power converter based on a result of the measurement, or: the cell-side control unit of each power cell is configured to receive, from the pod-side control unit, information regarding frequency and phase of a magnetic field in the magnetic core and to control the cell-side power converter based on the received information.

5. The power supply system of claim 3, wherein the power pod and the power cells held by the power pod are configured to transfer power from the power pod to at least one of the power cells using magnetic field coupling of a first frequency and to transfer power from at least another one of the power cells to the power pod using magnetic field coupling of a second frequency which is different from the first frequency.

6. The power supply system of claim 3, wherein the power pod and the power cells held by the power pod are configured to simultaneously transfer power from at least one of the power cells to at least another one of the power cells and to the power pod using magnetic field coupling.

7. The power supply system of claim 3, wherein the cell-side control unit of each power cell and the pod-side control unit of the power pod that holds the power cell are configured to communicate data and commands with each other by magnetic field coupling.

8. The power supply system of claim 7, wherein the magnetic field coupling used to transfer power bidirectionally between the power cells and the power pod has first frequencies, and the magnetic field coupling used to communicate data and commands between the cell-side control units and the pod-side control unit has second frequencies which are different from the first frequencies.

9. The power supply system of claim 7, wherein the cell-side control unit of each power cell is configured to read or record history and status information relating to operation of the power cell and to communicate the recorded history and status information to the pod-side control unit of the power pod that holds the power cell, wherein the history and status information includes one or more of: battery cell status, power cell identification or serial number, power cell model number, charge and discharge status of power cell, power cell exchange and charging station or pump information, power cell charge or discharge lock or unlock status, and power cell permanent disable status.

10. The power supply system of claim 3, comprising a plurality of power pods, wherein at least some of the power pods include a different number of power cells than at least some other power pods.

11. The power supply system of claim 10, further comprising a system controller electrically coupled to and configured to communicate with the pod-side control unit of each power pod, wherein the system controller is configured to perform load balancing among the plurality of power pods and power cells.

12. The power supply system of claim 1, wherein all power cells have the same mechanical size, and have the same or different energy storage capacities.

13. The power supply system of claim 1, wherein each power cell further includes a battery cell disable agent.

14. The power supply system of claim 1, further comprising an enclosure that encloses the plurality of power cells, the at least one power pod, and the mechanical transport system, wherein the enclosure has an access port, and wherein the mechanical transport system is configured to move any power cell from any power pod to the access port or from the access port to any power pod or between power pods.

15. A method of operating an in-vehicle power supply system, comprising:

providing a plurality of power cells, each power cell having one or more battery cells, a cell-side power converter and a cell-side control unit, the power cell defining a through hole, the cell-side power converter including a coil wound around the through hole;

providing at least one power pod, each power pod having a pod-side power converter and a pod-side control unit, the pod-side power converter including a magnetic core and a coil wound around a part of the magnetic core, the magnetic core including a plurality of posts each configured to pass through the though hole of one of the power cells, wherein the magnetic core is divided into a plurality of pieces, wherein a first subset of the plurality of pieces is moveable relative to a second subset of the pieces to reconfigure the magnetic core between a closed state and an open state, wherein in the closed state, the plurality of pieces mechanically contact each other to form closed magnetic circuits without air gap, and in the open state, some pieces among the first and second subsets that mechanically contact each other in the closed state are mechanically separated, wherein the open state is configured to allow each power cell to be moved into a position around a post or away from the post;

by a mechanical transport system, configuring the magnetic core in the open state, loading some of the power cells into the power pod, and then configuring the magnetic core in the closed state, wherein in the closed state, the through hole of each loaded power cell is disposed around one of the plurality of second posts and the magnetic core forms a closed loop;

transferring power to the power pod from a first one of the power cells loaded in the power pod by magnetic field coupling; and transferring power from the power pod to the first power cell or a second one of the power cells loaded in the power pod by magnetic field coupling.

16. The method of operating an in-vehicle power supply system of claim 15, further comprising:

unloading depleted or partially depleted power cells from the in-vehicle power supply system and loading charged power cells from a power cell exchange station.

17. The method of operating an in-vehicle power supply system of claim 15, wherein the transferring of power to the power pod from the first power cell uses magnetic field signals of a first frequency, and the transferring of power from the power pod to the second power cell uses magnetic field signals of a second frequency which is different from the first frequency, and wherein the transferring of power to the power pod from the first power cell and the transferring of power from the power pod to the second power cell occur simultaneously.

18. The method of operating an in-vehicle power supply system of claim 15, further comprising:

while transferring power to the power pod from the first power cell, simultaneously transferring power to a third one of the power cells from the first power cell.

19. The method of operating an in-vehicle power supply system of claim 15, further comprising:

by the power pod or some of the power cells, generating magnetic fields for power transmission;

by the cell-side power converter of each power cell, or by the pod-side power converter of the power pod, converting magnetic power to electrical power or converting electrical power to magnetic power;

by the pod-side control unit of the power pod, controlling the pod-side power converter; and by the cell-side control unit of each power cell, controlling the cell-side power converter based on either: measuring a frequency and a phase of a magnetic field in the post of the magnetic core that passes through the through hole of the power cell, or: receiving, from the pod-side control unit, information regarding a frequency and a phase of a magnetic field in the magnetic core.

20. The method of operating an in-vehicle power supply system of claim 15, further comprising:

by the cell-side control unit of each power cell, reading and recording history and status information relating to operation of the power cell, wherein the history and status information includes one or more of: battery cell status, power cell identification or serial number, power cell model number, charge and discharge status power cell, power cell exchange and charging station or pump information, power cell charge or discharge lock or unlock status, and power cell permanent disable status; and communicating data and commands between the pod-side control unit of a power pod and the cell-side control unit of each power cell in contact with the power pod, by magnetic field coupling using a third frequency which is different from the first and second frequencies.

21. An electric motor, comprising:

a rotor;

a magnetic core, including a plurality of first end pieces disposed around the rotor, one or more second end pieces spaced apart from the first end pieces, and a plurality of posts each extending between and in contact with one of the plurality of first end pieces and a corresponding one of the one or more second end pieces; and a plurality of power cells, each power cell including one or more battery cells and a cell-side power converter, the power cell defining a through hole, the cell-side power converter including a coil wound around the through hole, wherein one of the plurality of posts of the magnetic core passes through the through hole of the power cell, wherein the magnetic core and the coils of the plurality of power cells form a stator of the electric motor.

22. The electric motor of claim 21, wherein the one or more second end pieces are spaced apart from the first end pieces in a radial direction of the rotor, and wherein each of the plurality of posts extend in the radial direction between the one of the plurality of first end pieces and the corresponding one of the one or more second end pieces.

23. The electric motor of claim 21, wherein the one or more second end pieces are spaced apart from the first end pieces in an axial direction of the rotor, and wherein each of the plurality of posts extend in the axial direction between the one of the plurality of first end pieces and the corresponding one of the one or more second end pieces.

24. The electric motor of claim 21, wherein the plurality of first end pieces, the one or more second end pieces, and the plurality of posts are divided into at least a first subset of pieces and a second subset of pieces, wherein the first subset of pieces are moveable relative to the second subset of pieces to reconfigure the magnetic core between a closed state and an open state, wherein in the closed state, each of the plurality of posts mechanically contacts one of the plurality of first end pieces and a corresponding one of the one or more second end pieces, and in the open state, some pieces among the first and second subsets that mechanically contact each other in the closed state are mechanically separated, wherein the open state is configured to allow each power cell to be moved into a position around a post or away from the post.

25. The electric motor of claim 21, wherein each power cell further includes a cell-side control unit coupled to the cell-side power converter and configured to control the cell-side power converter, and wherein the electric motor further comprises a motor side controller, communicatively coupled to the cell-side control unit of each of the plurality of power cells, configured to communicate control signals and data with the cell-side control unit, and wherein the cell-side power converters of the plurality of power cells convert electrical energy stored in the power cells into magnetic fields configured to cause the rotor to rotate.

26. The electric motor of claim 25, wherein the motor side controller is communicatively coupled to the cell-side control unit of each of the plurality of power cells by magnetic field coupling via the magnetic core.

27. The electric motor of claim 25, wherein each power cell further includes an auxiliary communication port, wherein the motor further includes a plurality of communication towers, and wherein the motor side controller is communicatively coupled to the cell-side control units of the plurality of power cells via the communication towers and the auxiliary communication ports of the power cells using a magnetic field or electromagnetic waves.

28. The electric motor of claim 25, wherein the motor is an induction motor, a switched reluctance motor, or a synchronized reluctance motor.

29. The electric motor of claim 25, wherein the motor side controller is programmed with machine learning and artificial intelligence.

* * * * *